US008799753B2

United States Patent
Suzuki et al.

(10) Patent No.: US 8,799,753 B2
(45) Date of Patent: Aug. 5, 2014

(54) TRACE/FAILURE OBSERVATION SYSTEM, TRACE/FAILURE OBSERVATION METHOD, AND TRACE/FAILURE OBSERVATION PROGRAM

(75) Inventors: Noriaki Suzuki, Tokyo (JP); Junji Sakai, Tokyo (JP)

(73) Assignee: NEC Corporation, Tokyo (JP)

(*) Notice: Subject to any disclaimer, the term of this patent is extended or adjusted under 35 U.S.C. 154(b) by 365 days.

(21) Appl. No.: 12/863,934

(22) PCT Filed: Feb. 3, 2009

(86) PCT No.: PCT/JP2009/051752
§ 371 (c)(1),
(2), (4) Date: Jul. 21, 2010

(87) PCT Pub. No.: WO2009/099045
PCT Pub. Date: Aug. 13, 2009

(65) Prior Publication Data
US 2010/0299564 A1  Nov. 25, 2010

(30) Foreign Application Priority Data
Feb. 4, 2008  (JP) .................................. 2008-023780

(51) Int. Cl.
*G06F 7/02* (2006.01)
*G06F 11/00* (2006.01)
*G06F 11/36* (2006.01)
(52) U.S. Cl.
CPC ........ *G06F 11/3636* (2013.01); *G06F 11/3648* (2013.01)
USPC .......................................................... 714/819

(58) Field of Classification Search
CPC .................................. G06F 7/02; G06F 11/00
USPC ............................................................ 714/819
See application file for complete search history.

(56) References Cited

U.S. PATENT DOCUMENTS

| 4,086,626 A | * | 4/1978 | Chung | ......................... 712/244 |
| 5,509,329 A | * | 4/1996 | Jackson et al. | .............. 74/606 R |
| 7,149,926 B2 | * | 12/2006 | Ahmad et al. | .................. 714/30 |

(Continued)

FOREIGN PATENT DOCUMENTS

| JP | 61-52748 A | 3/1986 |
| JP | 62-121556 A | 6/1987 |

(Continued)

OTHER PUBLICATIONS

International Search Report mailed Apr. 7, 2009 in corresponding International Application No. PCT/JP2009/051752.

*Primary Examiner* — Amine Riad
(74) *Attorney, Agent, or Firm* — Sughrue Mion, PLLC

(57) ABSTRACT

There is provided a trace/failure observation system which is capable of comprehensive collection of information that is needed for checking a desired operation in a system or the like where the amount of information to be observed is large, and which allows easy analysis of the desired operation. The system includes, in a system LSI to be subjected to trace/failure observation: an event detecting means for observing behavior of a portion to be observed; a first data reducing means for performing observation data reduction processing so that observation data from the event detecting means has an amount of information processable to a second data reducing means; and the second data reducing means for performing one or more steps of observation data reduction processing.

13 Claims, 24 Drawing Sheets

(56) References Cited

U.S. PATENT DOCUMENTS

| | | | |
|---|---|---|---|
| 7,716,034 B2* | 5/2010 | Agarwala et al. | 703/23 |
| 7,730,249 B2* | 6/2010 | Yoshii et al. | 710/267 |
| 7,962,664 B2* | 6/2011 | Gotch et al. | 710/15 |
| 8,250,542 B1* | 8/2012 | Ball | 717/128 |
| 2004/0250164 A1* | 12/2004 | Ahmad et al. | 714/30 |
| 2005/0165990 A1* | 7/2005 | Kuki et al. | 710/260 |
| 2008/0244229 A1* | 10/2008 | Yao et al. | 712/205 |
| 2009/0089626 A1* | 4/2009 | Gotch et al. | 714/45 |
| 2010/0250052 A1* | 9/2010 | Ogino | 701/33 |
| 2012/0079328 A1* | 3/2012 | Sawaguchi | 714/47.1 |

FOREIGN PATENT DOCUMENTS

| | | |
|---|---|---|
| JP | 05-173846 A | 7/1993 |
| JP | 09-288594 A | 11/1997 |
| JP | 2001-147833 A | 5/2001 |
| JP | 2001-265619 A | 9/2001 |
| JP | 2002-024201 A | 1/2002 |
| JP | 2002-333998 A | 11/2002 |
| JP | 2004-013897 A | 1/2004 |
| JP | 2004-038981 A | 2/2004 |
| JP | 2006-031109 A | 2/2006 |
| JP | 2006-338305 A | 12/2006 |

* cited by examiner

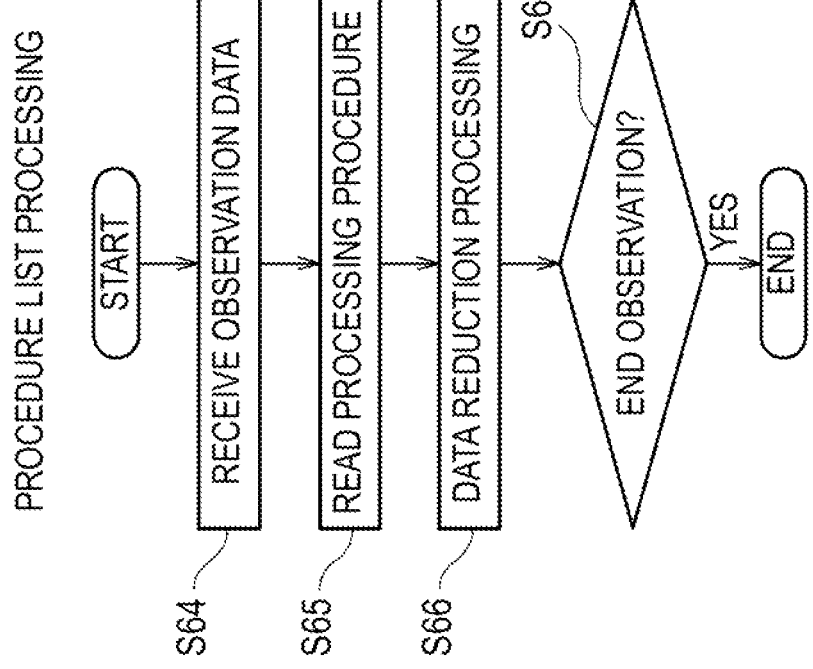
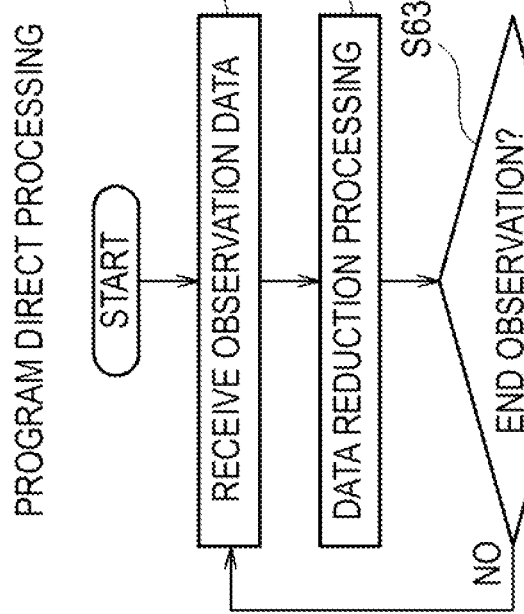

TRACE/FAILURE OBSERVATION SYSTEM, TRACE/FAILURE OBSERVATION METHOD, AND TRACE/FAILURE OBSERVATION PROGRAM

This application is the National Phase of PCT/JP2009/051752, filed Feb. 3, 2009, which is based upon and claims the benefit of priority from Japanese patent application No. 2008-023780, filed on Feb. 4, 2008, the disclosure of which is incorporated herein in its entirety by reference.

TECHNICAL FIELD

The present invention relates to a trace/failure observation system, a trace/failure observation method, and a trace/failure observation program, and more particularly to a trace/failure observation system, a trace/failure observation method, and a trace/failure observation program which reduce the amount of observation data.

BACKGROUND ART

With the sophistication of embedded devices in recent years, it has been desired to establish a technique for efficient debugging in the stages of development. The debugging of embedded devices often uses methods such as setting breakpoints with an in-circuit emulator (ICE) and performing single step execution. For systems that need to be real-time, however, such methods can fail to ensure proper timing with peripherals and are unusable in many cases.

Under the circumstances, it is of increasing importance to trace the internal operation of the devices and observe state changes and behavior. In order to reduce manufacturing cost, many embedded devices have only a small margin of built-in memory capacity and CPU performance. It is often not possible to satisfactorily use the method of keeping an operation log by software processing, which is employed in general computer apparatuses typified by servers and personal computers. Many embedded devices include application-specific system LSIs, where it is often important to observe the behavior of buses, peripheral circuits, and the like which cannot be observed by software processing alone.

In general, it is an effective technique to provide a mechanism to extract signals for investigating the operating state of a system LSI from monitor terminals, and utilize the monitor terminals to store changes in the operating state as trace data for analysis. Among the existing technologies with such a technique are "Semiconductor Integrated Circuit" described in PTL 1 and "Generation of Trace Signal in Data Processing" described in PTL 2.

FIG. 24 is a block diagram showing the internal configuration of a system LSI which is an embodiment of PTL 1. The system LSI of FIG. 24 includes an MPU core (control circuit) 91, a built-in RAM (Random Access Memory, memory circuit) 92 which contains a program for operating the MPU core 91, and a peripheral circuit 93 which transmits and receives signals to/from the MPU core 91. The system LSI is connected with a system LSI peripheral device 95. The system LSI and the system LSI peripheral device 95 transmit and receive signals to/from each other. Aside from the program for operating the MPU core 91, the built-in RAM 92 also contains a debug support function program.

A debug support circuit 914 having a built-in signal select circuit 931 is provided in the MPU core 91. A signal select circuit 932 is provided in the peripheral circuit 93. There are also provided a signal select circuit 933 which selects an ultimate monitor signal, and a monitor signal control circuit 94 which controls the select operations of the respective signal select circuits 931 to 933.

The system LSI of PTL 1 includes the signal select circuit 931 which selects any one of internal signals of the MPU core 91, the signal select circuit 932 which selects any one of internal signals of the peripheral circuit 93, and the signal select circuit 933 which selects either one of the outputs of the signal select circuits 931 and 932. The select operations of the signal select circuits 931 to 933 can be arbitrarily switched as needed. Such a configuration makes it possible to analyze the internal operation of the system LSI in real time and in detail. Even if the monitor terminals are limited, a plurality of monitor signals can be easily switched for output.

In PTL 2, the system includes a component whose operation is to be traced, and a trace generation unit that receives operation-indicating input signals from the component and generates high priority and low priority trace signals from the input signals as outputs to a trace receiving apparatus. When a suppression signal is issued from the trace receiving apparatus, the trace generation unit suppresses the occurrence of low priority trace signals to prevent the trace receiving apparatus from overflowing.

CITATION LIST

Patent Literature

{PTL 1} JP-A-2002-24201
{PTL 2} JP-A-2004-13897

SUMMARY OF INVENTION

Technical Problem

The trace/failure observation systems disclosed in PTL 1 and PTL 2 have several problems, however.

A first problem is that it is sometimes not possible to check a desired operation in a system or the like where the amount of information to be observed is large. The reason is that information on intended locations can be lost when such signals are not selected according to the technique of switching monitor signals or when low priority signals are suppressed according to the priority-based technique.

A second problem is that observation data needed for checking a desired operation can be buried to make the analysis difficult. The problem is due to an enormous amount of observation data, such as when observing a failure that occurs only occasionally in a long period of operation, where information useless for identifying the failure is also accumulated.

An object of the present invention is to provide a trace/failure observation system, a trace/failure observation method, and a trace/failure observation program which are capable of comprehensive collection of information that is needed for checking a desired operation in a system or the like where the amount of information to be observed is large, and which allow easy analysis of the desired operation.

Solution to Problem

According to the present invention, there is provided a trace/failure observation system that includes, in a system LSI to be subjected to trace/failure observation: an event detecting means for observing behavior of a portion to be observed; a first data reducing means for performing observation data reduction processing so that observation data from the event detecting means has an amount of information processable to a second data reducing means; and the second data reducing means for performing one or more steps of observation data reduction processing.

According to the present invention, there is also provided a trace/failure observation method which includes: an event detecting step of observing behavior of a portion to be observed; a first data reducing step of performing observation data reduction processing so that observation data on the detected event has an amount of information processable to a second data reducing step; and the second data reducing step of performing one or more steps of observation data reduction processing.

According to the present invention, there is also provided a trace/failure observation program for making a computer function as a trace/failure observation system that includes, in a system LSI to be subjected to trace/failure observation: an event detecting means for observing behavior of a portion to be observed; a first data reducing means for performing observation data reduction processing so that observation data from the event detecting means has an amount of information processable to a second data reducing means; and the second data reducing means for performing one or more steps of observation data reduction processing.

Advantageous Effects of Invention

An effect of the present invention is that it is possible to provide a trace/failure observation system that is capable of comprehensive collection of information that is needed for checking a desired operation in a system or the like where the amount of information to be observed is large.

The reason is that the reduction of the observation data by the first data reducing means and the second data reducing means eliminates the need for the selection or prioritization of monitor signals, allowing the comprehensive observation of the portion to be observed.

BRIEF DESCRIPTION OF DRAWINGS

FIG. 23A A first flowchart showing the processing procedure of a control processor according to the example of the present invention.

FIG. 23B A second flowchart showing the processing procedure of a control processor according to the example of the present invention.

DESCRIPTION OF EMBODIMENTS

Hereinafter, a best mode for carrying out the present invention will be described in detail with reference to the drawings.

First Embodiment

Figure 1:
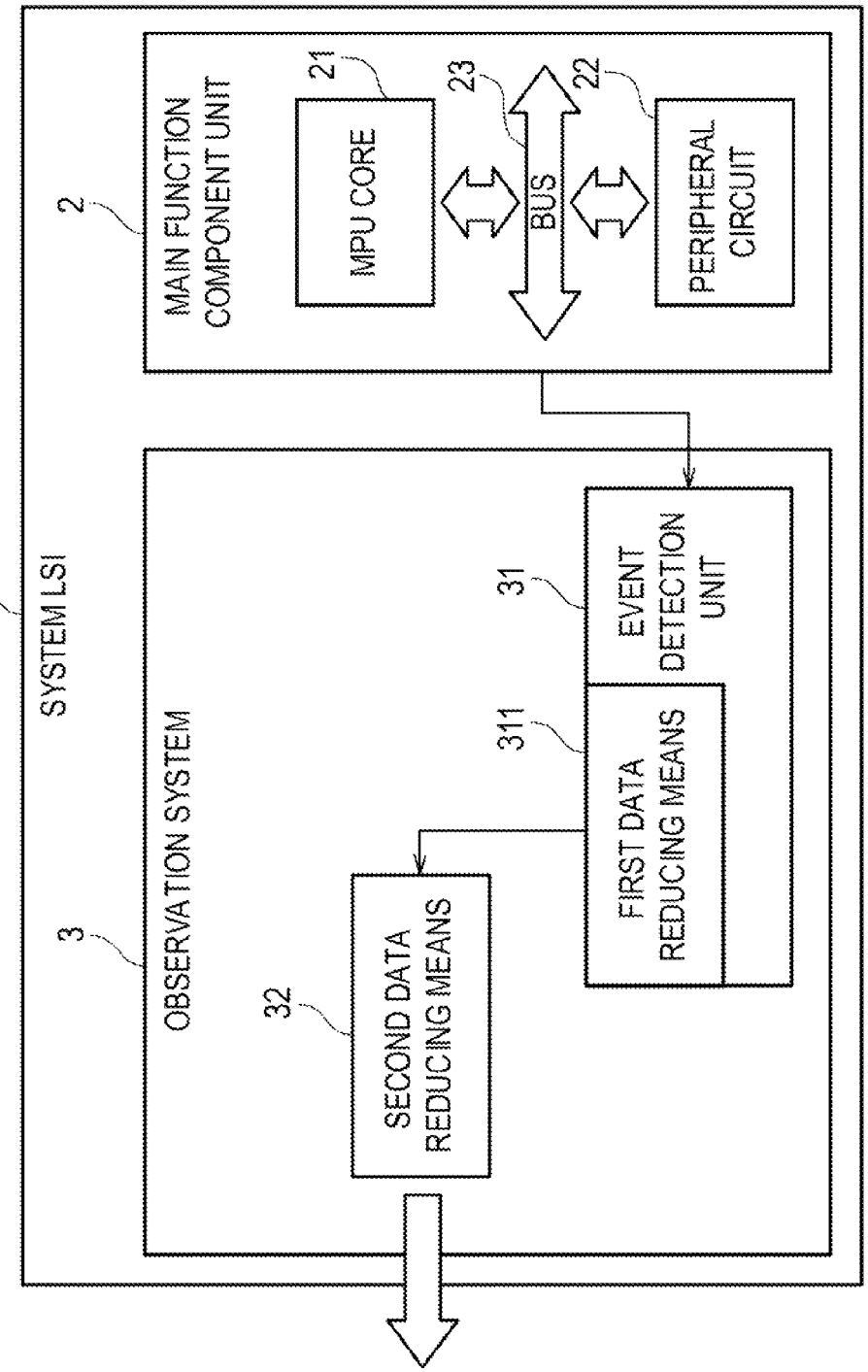
FIG. 1 A block diagram showing the configuration of a first embodiment of the present invention.

FIG. 1 is a block diagram showing the overall configuration of a trace/failure observation system according to a first embodiment of the present invention. The reference sign 1 represents a system LSI, which includes a main function component unit 2 to be observed and an observation system 3. The main function component unit 2 typically has a MPU core 21, a peripheral circuit 22, and the like. The observation system 3 includes an event detection unit 31, a first data reducing unit 311, and a second data reducing unit 32. The event detection unit 31 detects the behavior of the portion to be observed (in the present embodiment, the main function component unit 2) and outputs observation data. Here, the target of observation of the event detection unit 31 is not limited to the MPU core 21, and any components such as the peripheral circuit 22 and a bus 23 may be observed. The first data reducing unit 311 performs observation data reduction processing so that the observation data from the event detection unit 31 has an amount of information processable to the second data reducing unit 32. The present embodiment deals with the case where the first data reducing unit 311 is arranged in the event detection unit 31 so that the event detection processing and the first data reduction processing are performed in combination. However, the event detection unit 31 and the first data reducing unit 311 may be separated or unseparated in configuration. The second data reducing unit 32 performs a plurality of steps of advanced observation data reduction processing with the observation data reduced by the first data reducing unit 311 as the input. The observation data therefore needs to have been reduced by the first data reducing unit 311 so that the observation data has the amount of information processable to the second data reducing unit 32.

Next, the operation of the trace/failure observation system will be described with reference to a flowchart of FIG. 2 and a timing chart of FIG. 3.

Figure 2:
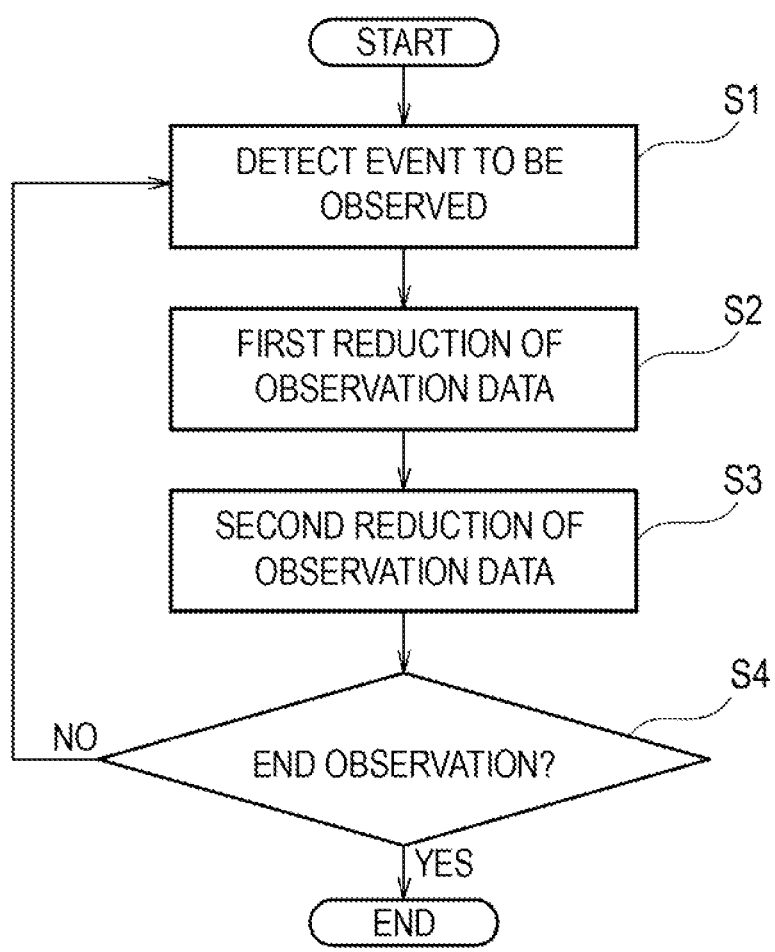
FIG. 2 A flowchart showing the processing procedure of a trace/failure observation system according to the first embodiment of the present invention.

The overall processing procedure will be first outlined with reference to the flowchart shown in FIG. 2. Initially, at step S1, the event detection unit 31 observes the main function component unit 2 to be observed, detects an event such as a change of a signal and the occurrence of data transfer, and outputs observation data. Next, at step S2, the first data reducing unit 311 reduces the observation data from the event detection unit 31 so that the observation data has an amount of information processable to the second data reducing unit 32, and outputs the observation data. Next, at step S3, the second data reducing unit 32 performs a plurality of steps of advanced data reduction processing using the observation data reduced by the first data reducing unit 311. Then, if there is an instruction to end the observation (Yes at step S4), the observation is ended. If not (No at step S4), the processing returns to step S1.

While in the flowchart of FIG. 2, the procedure is described so that steps S1, S2, and S3 are sequentially processed one by one, the steps need not be sequentially processed one by one as long as the data flows as shown in the flowchart. Typically, steps S1, S2, and S3 are simultaneously processed in parallel.

The processing of the first observation data reduction and second observation data reduction is not limited to the mere exclusion of unneeded data. The addition of data such as a time stamp for improved analysis efficiency, the reconstruction of new data contents based on a plurality of pieces of observation data, and other methods may be employed as long as the total amount of data is reduced.

Figure 3:
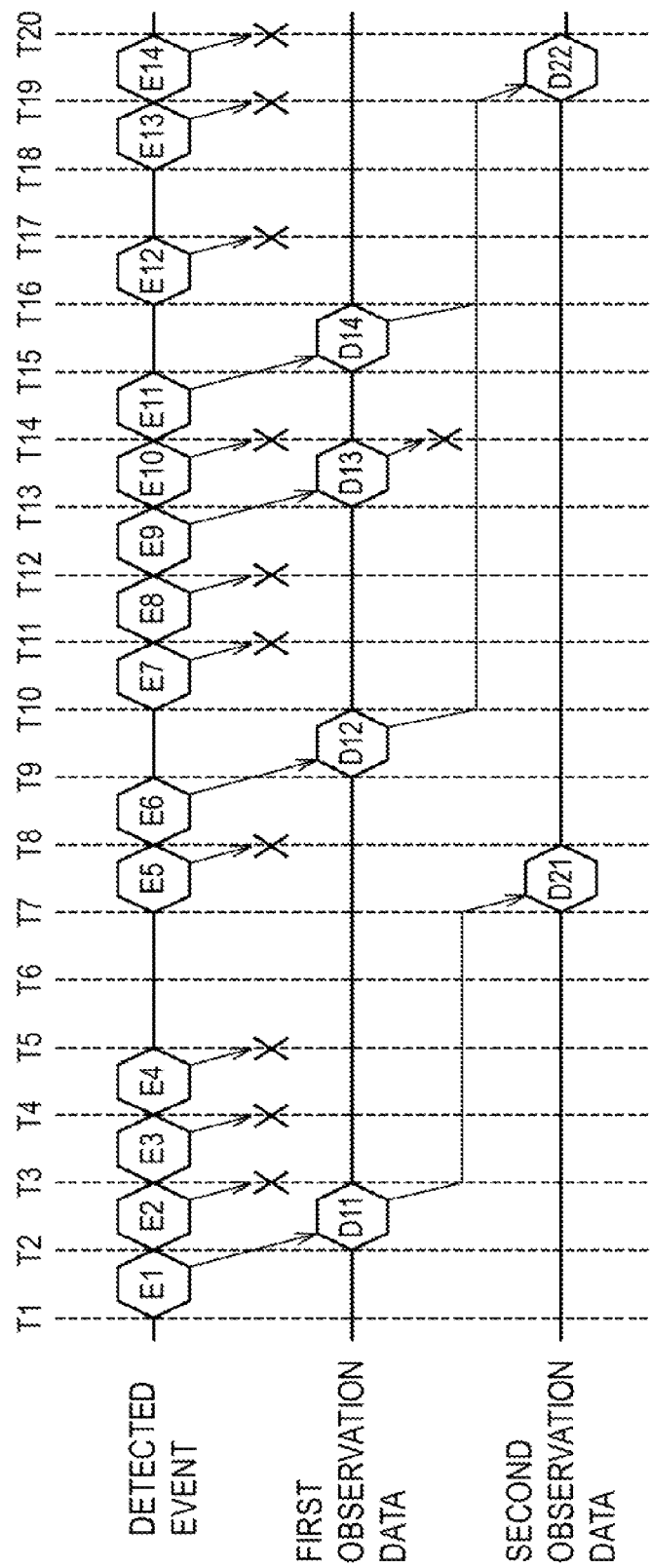
FIG. 3 A timing chart showing the processing of the trace/failure observation system according to the first embodiment of the present invention.

Referring to the timing chart of FIG. 3, T1 to T20 represent times on the internal processing cycle (such as clock cycle) of the system LSI. E1 to E14 represent events observed by the event detection unit 31. D11 to D14 represent pieces of observation data after the reduction processing of the first data reducing unit 311. D21 and D22 represent pieces of observation data after the reduction processing of the second data reducing unit.

The event detection unit 31 initially detects the events E1 to E4, E5 and E6, E7 to E11, E12, and E13 and E14 at times T1 to T4, T7 and T8, T10 to T14, T16, and T18 and T19, respectively. The event detection unit 31 transmits the observation data to the first data reducing unit 311.

The first data reducing unit 311 reduces the observation data transmitted from the event detection unit 31 according to a data reduction condition. The data reduction condition is desirably capable of arbitrary changes. For the reduction, techniques such as determining the necessity of the observation data based on the data reduction condition and passing only needed pieces of data may be employed. FIG. 3 shows an example of the technique of determining the necessity of the observation data piece by piece. In the processing, E1, E6, E9, and E11 are determined to be the needed pieces of data, and the rest of the data is discarded. Another technique available is to screen out unneeded portions from needed portions of the observation data. Both the techniques may be used in combination, i.e., whereby E1, E6, E9 and E11 are passed while part of the data is further extracted with a reduction in the amount of data. The observation data output from the first data reducing unit 311 is then transmitted to the second data reducing unit 32.

The second data reducing unit 32 performs additional reduction processing on the observation data output from the first data reducing unit 311 with a multi-step procedure. In the example of FIG. 3, the first observation data D11 is processed into second observation data D21 for output. With the input of D12 to D14, the whole of the piece of data D13 is determined to be unneeded and is discarded while D12 and D14 are processed into second observation data D22 for output.

Figure 4:
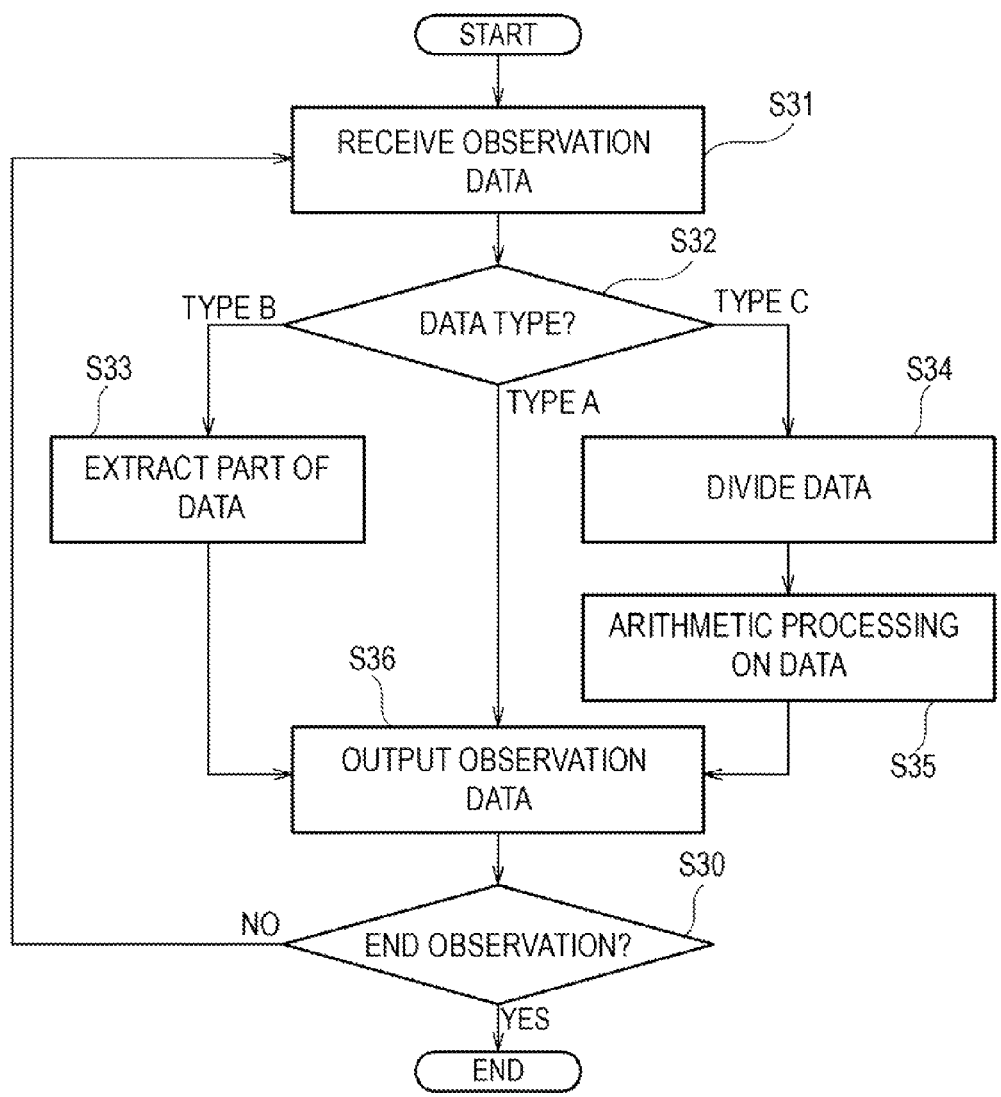
FIG. 4 A flowchart showing the processing procedure of a second data reducing means according to the first embodiment of the present invention.
Figure 5:
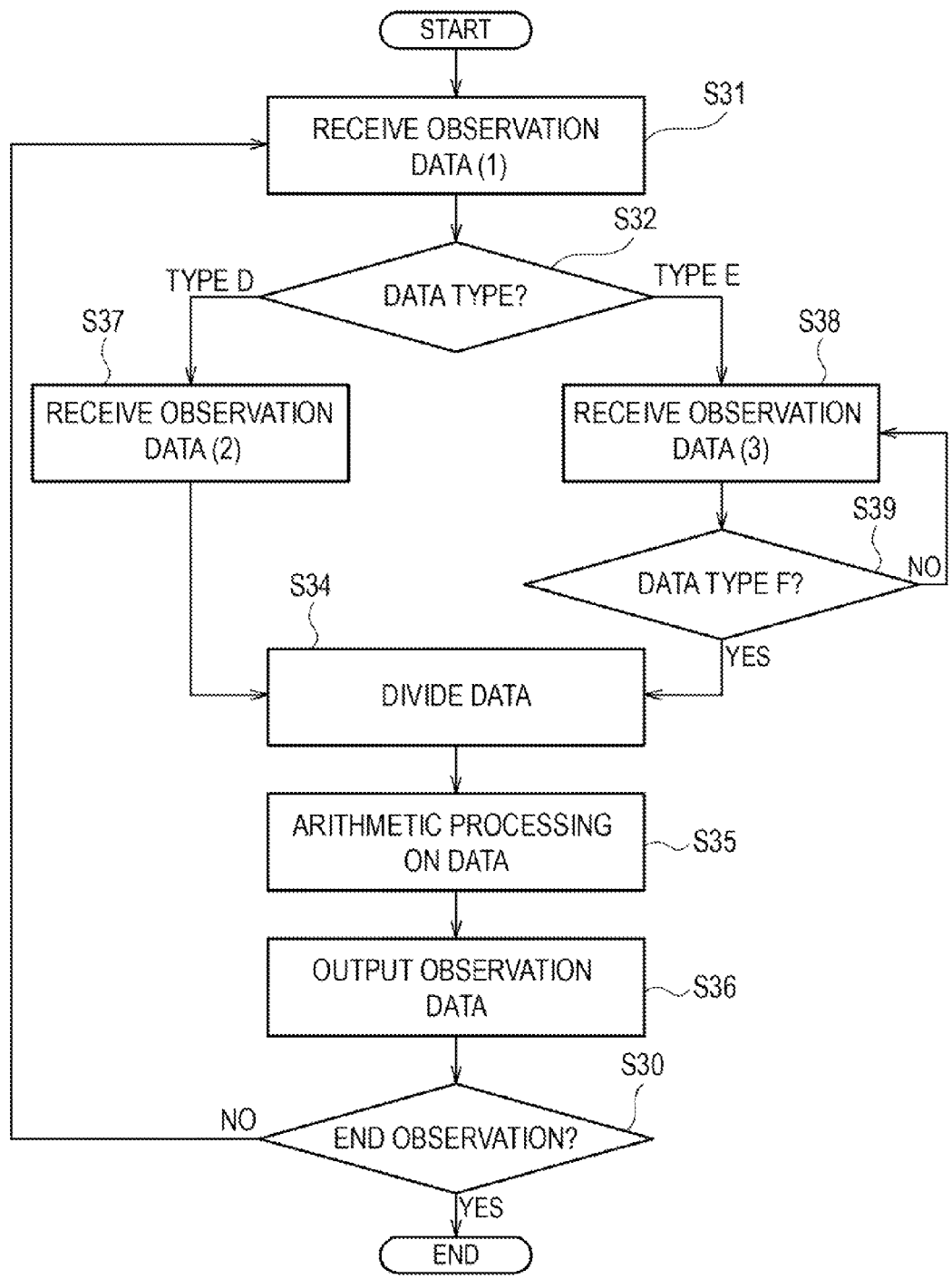
FIG. 5 A flowchart showing the processing procedure of the second data reducing means according to the first embodiment of the present invention.

FIGS. 4 and 5 are flowcharts showing examples of the reduction processing of the second data reducing unit 32. FIG. 4 shows an example that corresponds to processing such that the first observation data D11 is processed into the second observation data D21 for output. FIG. 5 shows an example that corresponds to processing such that the first observation data D12 to D14 is processed into the second observation data D22 for output.

Referring to the flowchart of FIG. 4, the example of the reduction processing of the second data reducing unit 32 will be described first. Initially, at step S31, the second data reducing unit 32 receives observation data from the first data reducing unit 311, and determines the type of the observation data (step S32). If the observation data is of type A (Type A at step S32), the second data reducing unit 32 determines that the entire piece of data is needed, and proceeds to step. S36 without any particular processing. If the observation data is of type B (Type B at step S32), the second data reducing unit 32 determines the data of this type to be useful only in part, and extracts part of the data (step S33) and proceeds to step S36. If the observation data is of type C (Type C at step S32), the second data reducing unit 32 determines that a plurality of separate fields of the observation data can be arithmetically processed and reconstructed for data reduction. In such a case, the second data reducing unit 32 initially divides the observation data into fields (step S34), arithmetically processes the data field by field to reconstruct the data for data reduction (step S35), and proceeds to step S36. Finally, at step S36, the second data reducing unit 32 outputs the observation data that is processed by type. If the observation is to be ended (Yes at step S30), the processing ends here. If the observation is to be continued (No at step S30), the processing returns to step S31.

Next, referring to the flowchart of FIG. 5, the example of the reduction processing of the second data reducing means 32 will be described. Initially, at step S31, the second data reducing means 32 receives observation data from the first data reducing means, and determines the type of the observation data (step S32). If the observation data is of type D (Type D at step S32), the second data reducing means 32 determines that the next piece of observation data is relevant data, and receives the next piece of observation data (step S37). The second data reducing means 32 then proceeds to step S34. If, at step 32, the observation data is of type E (Type E at step 32), the second data reducing means 32 determines that there will be a relevant piece of observation data of type F and it is unknown when the observation data of type F will be observed. The second data reducing means 32 receives the next piece of observation data (step S38), and then determines the data type (step S39). If the data type is other than type F (No step S39), the second data reducing means 32 returns to step S38 to receive the next piece of observation data again. If the data type is type F (Yes at step S39), the second data reducing means 32 proceeds to step S34. Since a plurality of pieces of relevant observation data have been acquired by the time when the second data reducing means 32 reaches step S34, the second data reducing means 32, at step 34, divides the plurality of pieces of observation data into fields (step S34). The second data reducing means 32 arithmetically processes the data field by field and to reconstruct the data for reduction (step S35), and proceeds to step S36. Finally, at step S36, the second data reducing means 32 outputs the observation data that is processed by type. If the observation is to be ended (Yes at step S30), the processing ends here. If the observation is to be continued (No at step S30), the processing returns to step S31.

It should be appreciated that the reduction processing of the second data reducing unit 32 may be applied irrespective of the procedures of FIGS. 4 and 5. FIGS. 4 and 5 may be combined. The steps in FIGS. 4 and 5 may be used in various combinations. The number of pieces of observation data to be input for the reduction processing may be set arbitrarily.

The reduction procedure of the second data reducing unit 32 may use techniques such as retrospectively consulting past observation data for reduction criteria, and combining information that is input from outside the system LSI with the current observation data for determination.

As employed herein, the system LSI shall cover a SiP (System in Package), MCP (Multi Chip Module), PoP (Package on Package), and other integrated bodies of a plurality of chips, with communication capabilities within the integrated body sufficiently higher than for external communications.

In the trace/failure observation system of the present embodiment, the observation data on the portion to be observed, detected by the event detecting unit 31, is reduced by the first data reducing unit 311 so that the observation data has an amount of information processable to the second data reducing unit. Then, the second data reducing unit 32 further reduces the observation data from the first data reducing unit 311 by a plurality of steps of reduction processing, and outputs the resultant.

Next, the effects of the present embodiment will be described.

In the present embodiment, the reduction of the observation data by the first data reducing means and the second data reducing means eliminates the need for the selection or prioritization of monitor signals. This allows the comprehensive observation of information that is needed for checking a desired operation in a system or the like where the amount of information to be observed is large.

In the present embodiment, the first data reducing means and the second data reducing means can exclude information that is not needed for identifying a desired operation. With such a configuration, it is possible to provide a trace/failure observation system that can easily analyze a desired operation.

It is also possible to provide a trace/failure observation system that is capable of comprehensive collection of information that is needed for checking a desired operation in a system or the like where the amount of information to be observed is large.

The reason is that the reduction of the observation data by the first data reducing means and the second data reducing means eliminates the need for the selection or prioritization of monitor signals, thereby allowing the comprehensive observation of the portion to be observed.

Moreover, it is possible to provide a trace/failure observation system that can easily analyze a desired operation.

The reason is that information not needed for identifying a desired operation can be excluded by the first data reducing means and the second data reducing means.

Second Embodiment

Next, a best mode for carrying out a second invention of the present invention will be described in detail with reference to the drawings.

Figure 6:
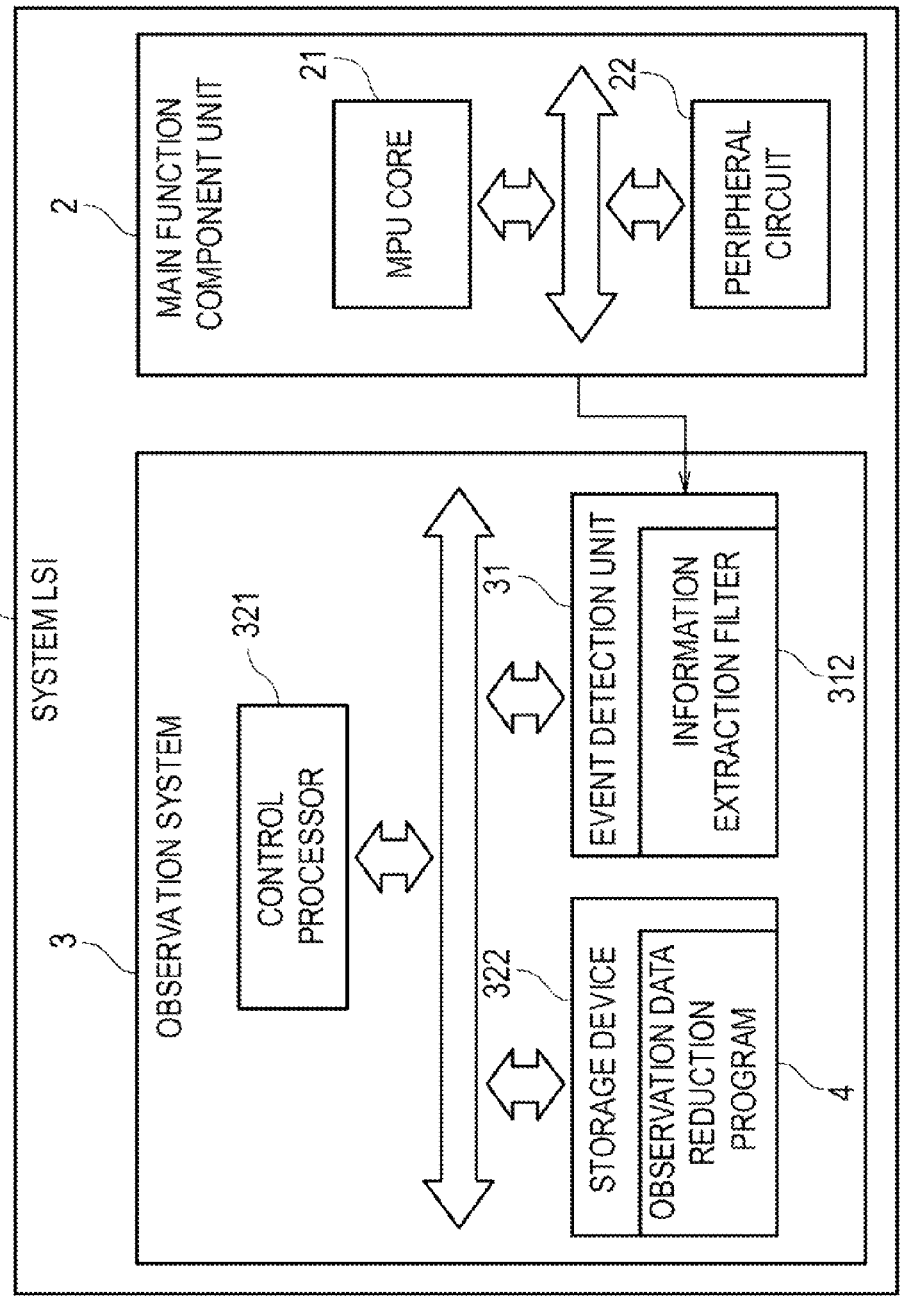
FIG. 6 A block diagram showing the configuration of a second embodiment of the present invention.

FIG. 6 is a block diagram showing the overall configuration of the trace/failure observation system according to a second embodiment of the present invention. In the present embodiment, the second data reducing unit 32 according to the first embodiment includes a control processor 321, a storage device 322, and an observation data reduction program 4. The first data reducing unit 311 of the first embodiment is implemented by an information extraction filter 312. It is desirable that a plurality of data reduction conditions can be set in the information extraction filter 312.

Figure 7:
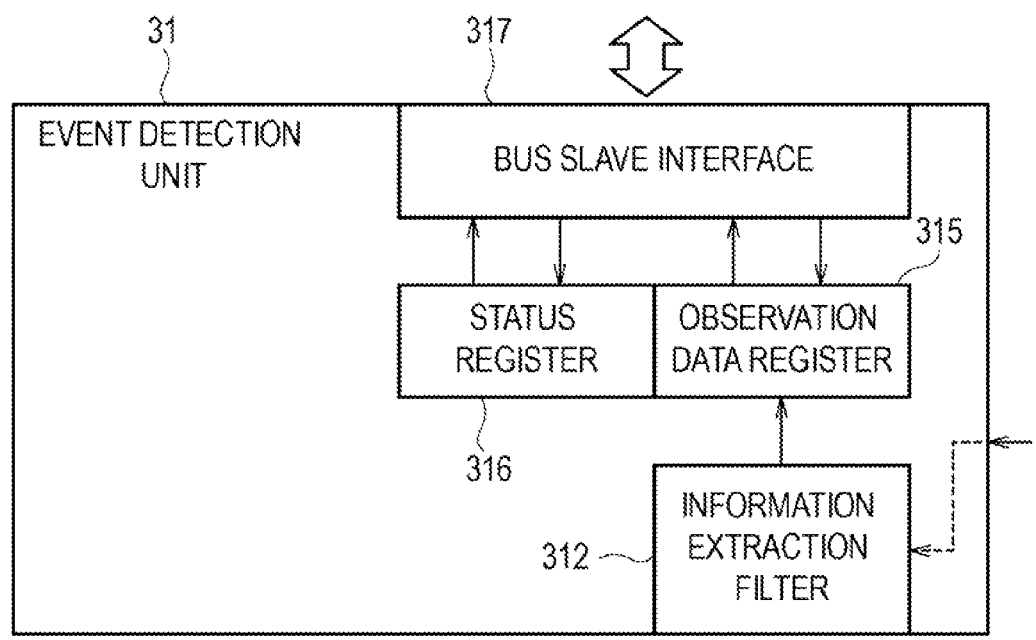
FIG. 7 A block diagram showing the configuration of an event detection unit according to the second embodiment of the present invention.

Next, the event detection unit 31 will be described in detail with reference to FIG. 7. Aside from the information extraction filter 312, the event detection unit 31 includes: a bus slave interface 317 which is a bus connection port for connecting the control processor 321 with the event detection unit 31; an observation data register 315 which stores observation data that is reduced by the information extraction filter; and a status register 316 that indicates the internal state of the event detection unit 31. The status register 316 displays information such as whether or not the observation data register 315 contains effective data.

Figure 8:
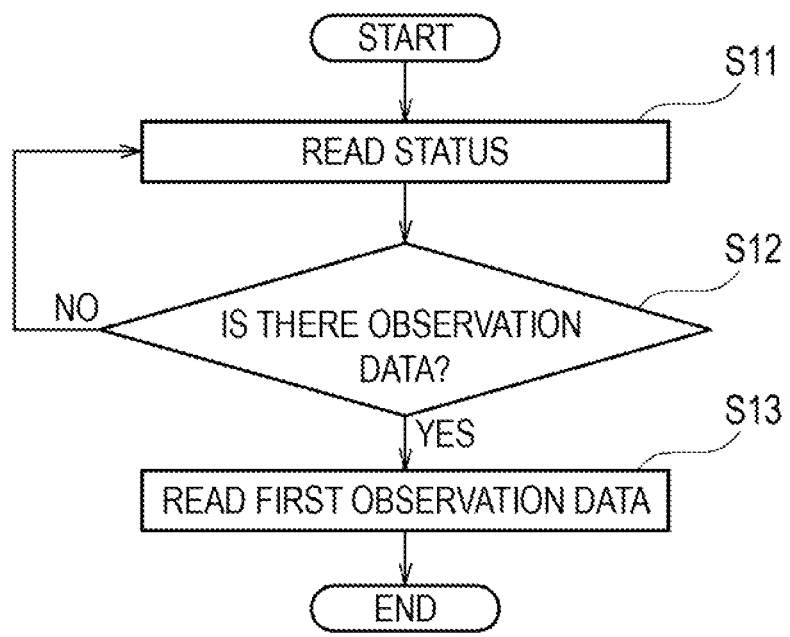
FIG. 8 A flowchart showing the procedure of observation data reception processing of the trace/failure observation system according to the second embodiment of the present invention.

Next, the operation of the trace/failure observation system according to the second embodiment will be described with reference to a flowchart of FIG. 8. The overall operation of the trace/failure observation system according to the second embodiment is the same as in the first embodiment. In the second embodiment, the procedure of receiving observation data in FIGS. 4 and 5 is performed by the control processor 321 according to the flowchart of FIG. 8. As shown in FIG. 8, when receiving observation data, the control processor 321 consults the status register 316 in the event detection unit 31 (step S11). If the value of the status register 316 indicates the absence of effective data in the observation data register 315 (No at step S12), the control processor 321 returns to step S11. If the value of the status resister 316 indicates the presence of effective data in the observation data resister 315 (Yes at step S12), the control processor 321 reads the observation data from the observation data register 315 (step S13).

Next, the effect of the present embodiment will be described.

In the present embodiment, the second data reducing unit 32 includes the control processor 321, the storage device 322, and the observation data reduction program 4. The observation data reduction program 4 may be replaced to change the data reduction procedure of the second data reducing unit 32 easily.

Third Embodiment

Next, a best mode for carrying out a third invention of the present invention will be described in detail with reference to the drawings.

A trace/failure observation system according to a third embodiment of the present invention has the same overall configuration as that of the second embodiment of the present invention. A flowchart of FIG. 9 and a timing chart of FIG. 10 show the operation of the trace/failure observation system according to the third embodiment of the present invention.

Figure 9:
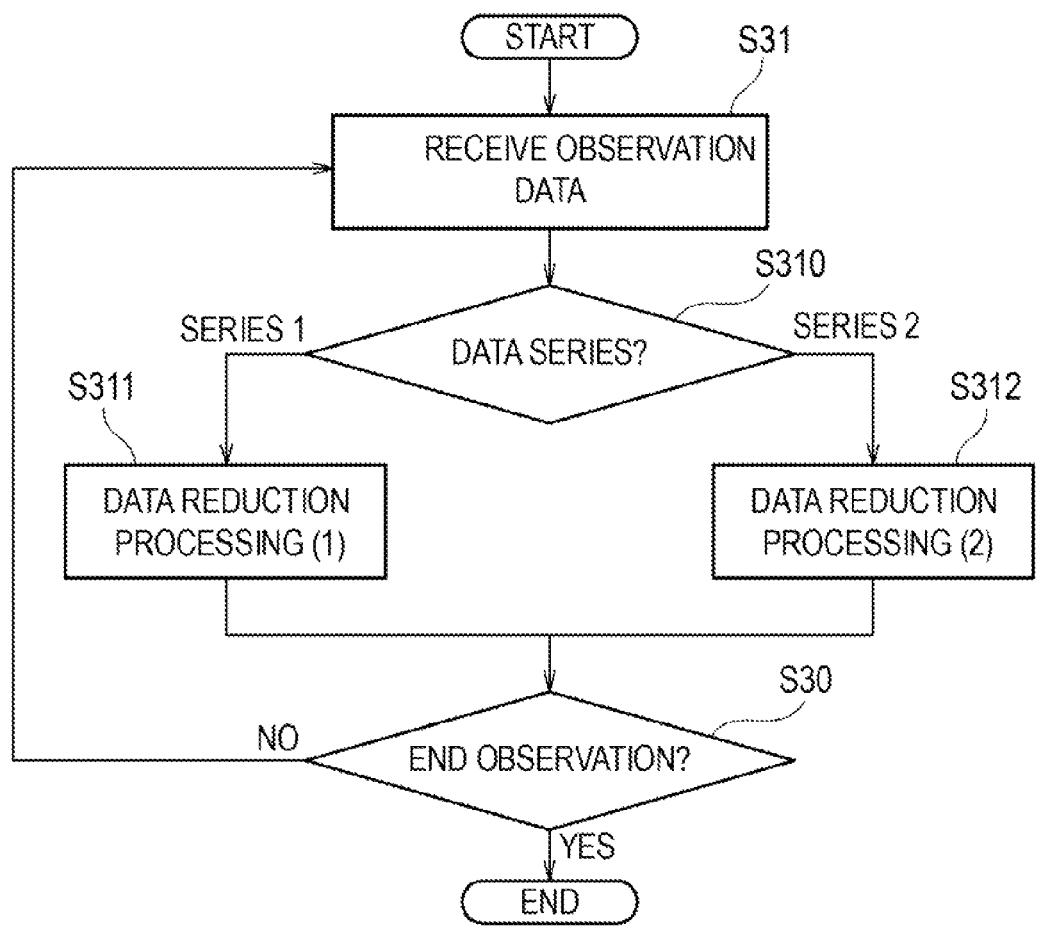
FIG. 9 A flowchart showing the processing procedure of the trace/failure observation system according to a third embodiment of the present invention.

The operation of the trace/failure observation system according to the third embodiment will initially be described with reference to the flowchart of FIG. 9. Initially, at step S31, the trace/failure observation system receives observation data and makes a determination on a data series (step S310). If the observation data is determined to be of series 1 (Series 1 at step S310), the trace/failure observation system performs data reduction processing of data series 1 (step S311), and proceeds to step S30. If the observation data is determined to be of series 2 (Series 2 at step S310), the trace/failure observation system performs data reduction processing of data series 2 (step S312), and proceeds to step S30. At step S30, the trace/failure observation system returns to step S31 to receive observation data unless the observation is to be ended (Yes at step S30). The data reduction processing of steps S311 and S312 represents various types of reduction processing, typified by all or part of the data reduction processing illustrated in FIGS. 4 and 5 and a combination thereof.

Figure 10:
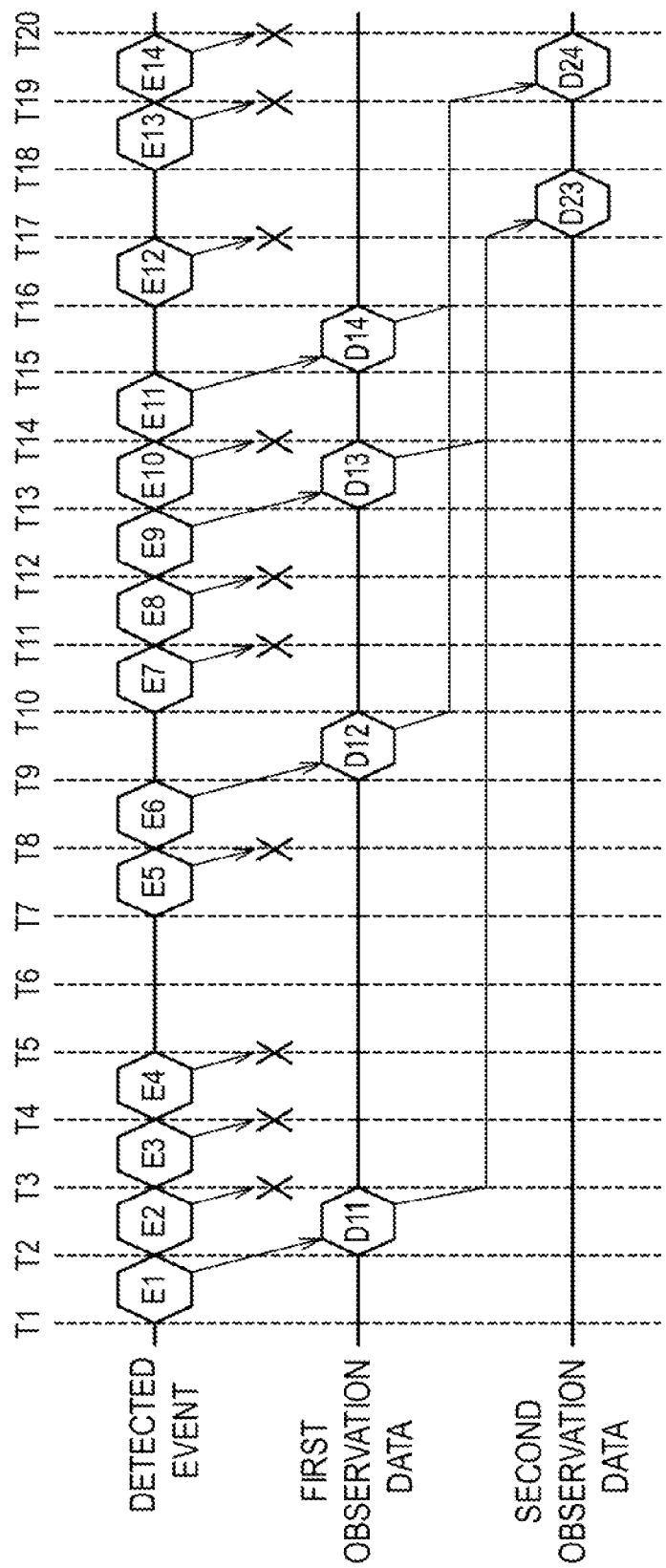
FIG. 10 A timing chart showing the processing of the trace/failure observation system according to the third embodiment of the present invention.

Next, referring to the timing chart of FIG. 10, T1 to T20 represent times on the internal processing cycle (such as clock cycle) of the system LSI. E1 to E14 represent events observed by the event detection unit. D11 to D14 represent pieces of observation data after the reduction processing of the first data reducing unit 311. D23 and D24 represent pieces of observation data after the reduction processing of the second data reducing unit. In this timing chart, the processing from the reduction processing of the first data reducing unit 311 to the output of the observation data D11 to D14 is the same as in the timing chart of FIG. 3. On the other hand, according to the operation example of the timing chart, the second data reducing unit 32 generates observation data D23 from the observation data D11 and D13, and observation data D24 from the observation data D12 and D14.

It should be noted that while the foregoing description has dealt with an example with two series of observation data, similar processing of data series capable of concurrent processing may be added for use with a system that is intended to observe three or more series of data. When not using the control processor 321, the function of processing a plurality of data series may be built in the second data reducing unit 32 without the observation data reduction program 4.

Next, the effect of the present embodiment will be described.

The present embodiment is configured to separate the received observation data into respective data series for processing. When the operation to be observed involves a plurality of pieces of observation data, it is therefore possible to perform the data reduction processing even on the observation target from which one series of observation data and another can be detected in parallel.

Fourth Embodiment

Next, a best mode for carrying out a fourth invention of the present invention will be described in detail with reference to the drawings.

Figure 11:
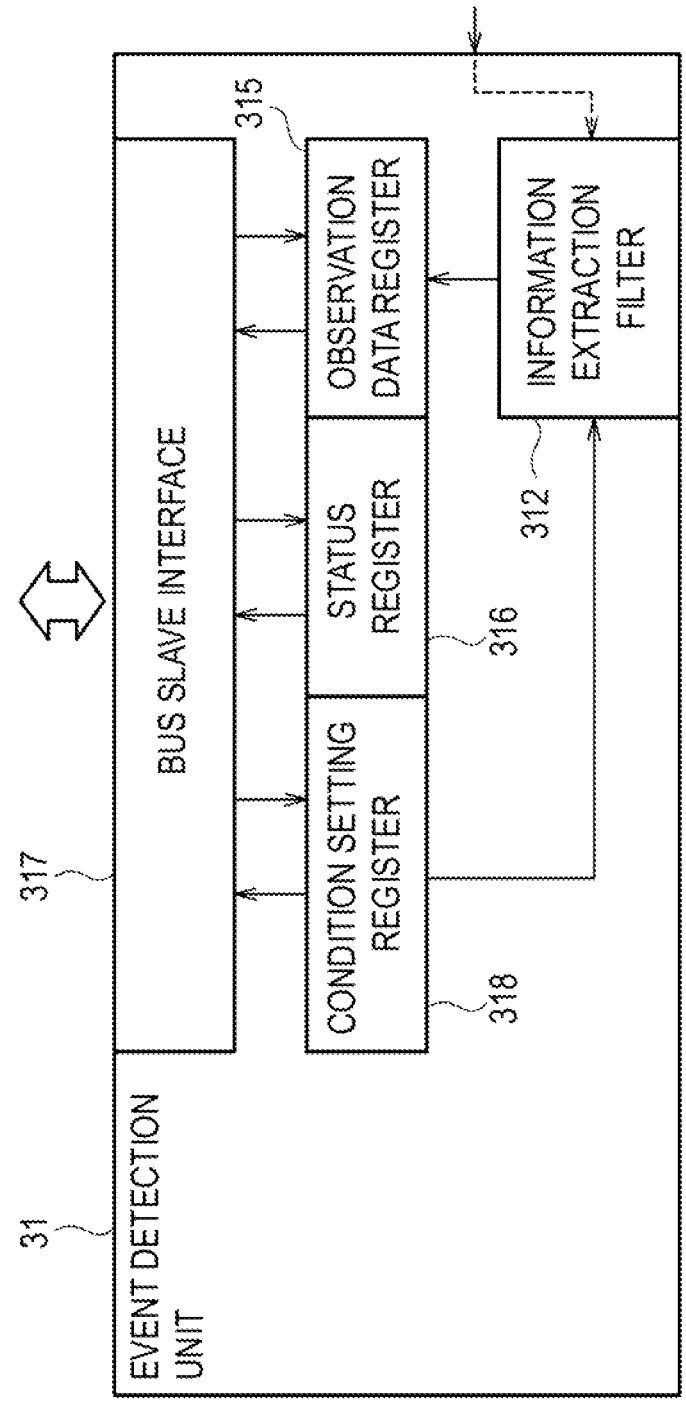
FIG. 11 A block diagram showing the configuration of the event detection unit according to a fourth embodiment of the present invention.

FIG. 11 is a block diagram showing the configuration of the event detection unit 31 in the trace/failure observation system according to a fourth embodiment of the present invention. In the present embodiment, a condition setting register 318 that makes it possible for the control processor 321 to change the data reduction condition of the information extraction filter 312 is provided in addition to the configuration of the event detection unit 31 according to the second embodiment.

Next, the operation of the trace/failure observation system according to the fourth embodiment will be described with reference to flowcharts of FIGS. 12 and 13. The trace/failure observation system according to the fourth embodiment of the present invention is characterized in that a state machine function is provided as the observation data reduction program 4 of the trace/failure observation system according to the second embodiment. With reference to the flowcharts of FIGS. 12 and 13, description will be given of the state machine-based configuration with two states, state 1 and state 2.

Figure 12:
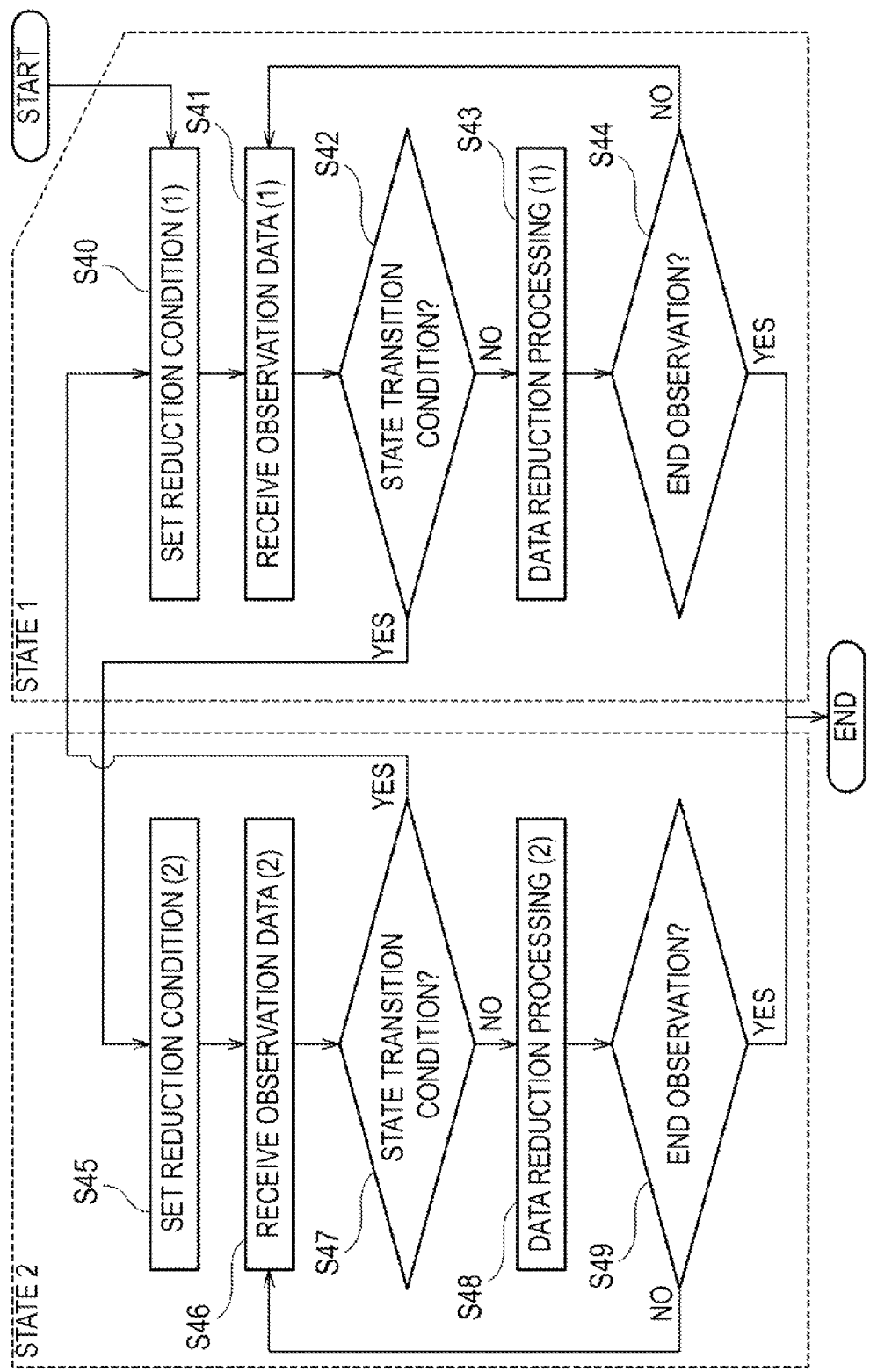
FIG. 12 A flowchart showing the processing procedure of the trace/failure observation system according to the fourth embodiment of the present invention.

In the flowchart of FIG. 12, steps S40 to S44 show the reduction processing in state 1, and steps S45 to S49 the reduction processing in state 2. The data reduction processing of steps S43 and S48 represents various types of reduction processing, typified by all or part of the data reduction processing illustrated in FIGS. 4 and 5 and a combination thereof. When the observation is started, the control processor initially writes a set value to the condition setting register 318 of FIG. 11, thereby setting the data reduction condition of the information extraction filter so that data to be observed in state 1 can be received (step S40). Next, at step S41, the observation data is received. If the observation data received does not meet a state transition condition (No at step S42), the control processor 321 performs the data reduction processing of step S43, and returns to step S41 (No at step S44) unless the observation is to be ended (Yes at step s44). On the other hand, if the state transition condition holds at step S42 (Yes at step S42), the control processor 321 makes a transition to state 2. The control processor 321 sets the data reduction condition of the information extraction filter 312 so that observation data to be observed in state 2 can be received (step S45), and proceeds to the observation data reception processing of step S46. The processing of step S46 and subsequent steps in state 2 is the same as in state 1. In FIG. 12, the processing of steps S40 and S45 may be omitted if the data reduction condition of the information extraction filter 312 need not be changed. In another possible method, steps S42 and S47 for making a determination on the state transition condition may be performed after the data reduction processing of steps S43 and S48, respectively.

Figure 13:
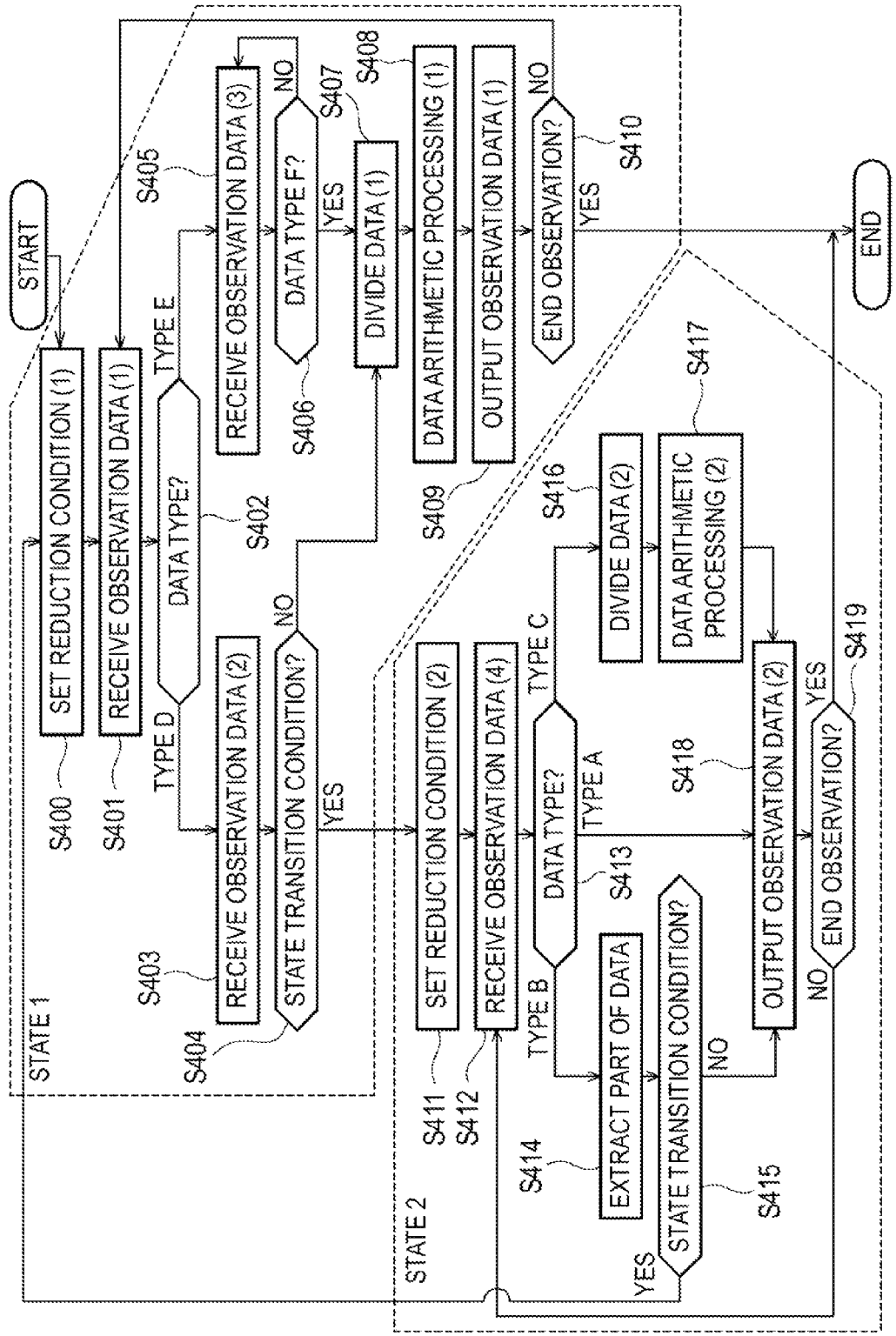
FIG. 13 A flowchart showing the processing procedure of the trace/failure observation system according to the fourth embodiment of the present invention.

The flowchart of FIG. 13 shows an example where the reduction processing corresponding to the flowchart of FIG. 5 is applied to that of state 1 in the flowchart of FIG. 12, and the reduction processing corresponding to the flowchart of FIG. 4 is applied to that of state 2. In state 1 of FIG. 13, the determination of whether to make a state transition to state 2 is added to after the reception of the observation data at step S37 in the processing of the observation data of type D in the flowchart of FIG. 5 (step S403 in FIG. 13). In state 2 of FIG. 13, the determination of whether to make a state transition to state 1 is added to after the extraction of part of data at step S33 in the processing of the observation data of type B in the flowchart of FIG. 4 (step S414 in FIG. 13). The operations in state 1 and state 2 follow the examples of the flowcharts of FIGS. 5 and 4, respectively.

It should be appreciated that while the foregoing description has dealt with an example with two states, similar state transition processing may be added for use with a system with three or more states. When not using the control processor 321, the state machine function may be built in the second data reducing unit 32 without the observation data reduction program 4.

Next, the effect of the present embodiment will be described.

The present embodiment is configured so that the reduction processing can be switched by the state machine function. It is therefore possible to switch to and perform observation with a data reduction technique of high efficiency depending on the condition of the observation target.

Fifth Embodiment

Next, a best mode for carrying out a fifth invention of the present invention will be described in detail with reference to the drawings.

Figure 14:
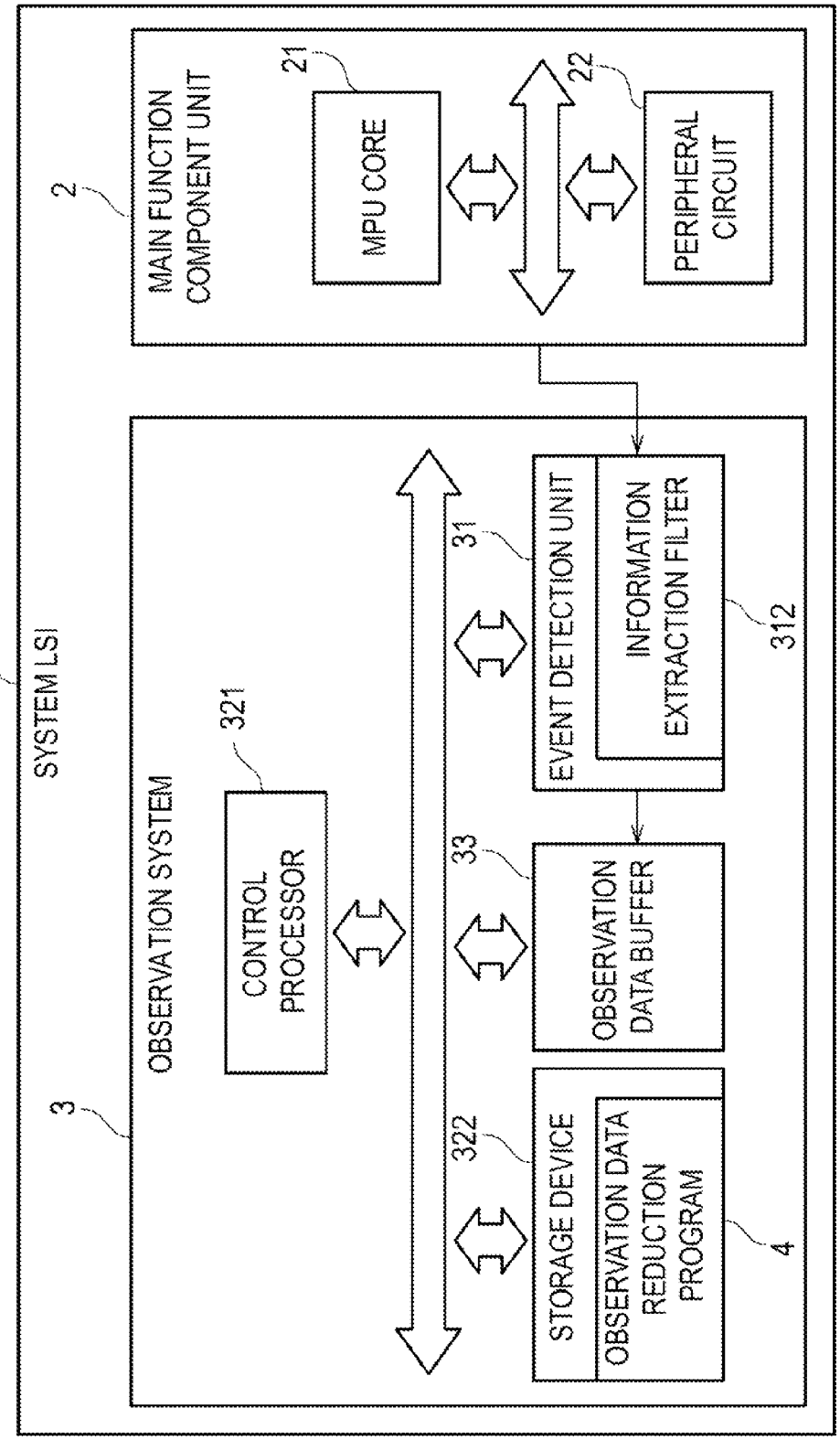
FIG. 14 A block diagram showing the configuration of a fifth embodiment of the present invention.

FIG. 14 is a block diagram showing the overall configuration of the trace/failure observation system according to a fifth embodiment of the present invention. In the present embodiment, an observation data buffer 33 that temporarily stores the observation data output from the event detection unit 31 and information extraction filter 312 is provided in addition to the configuration of the second embodiment.

Figure 15:
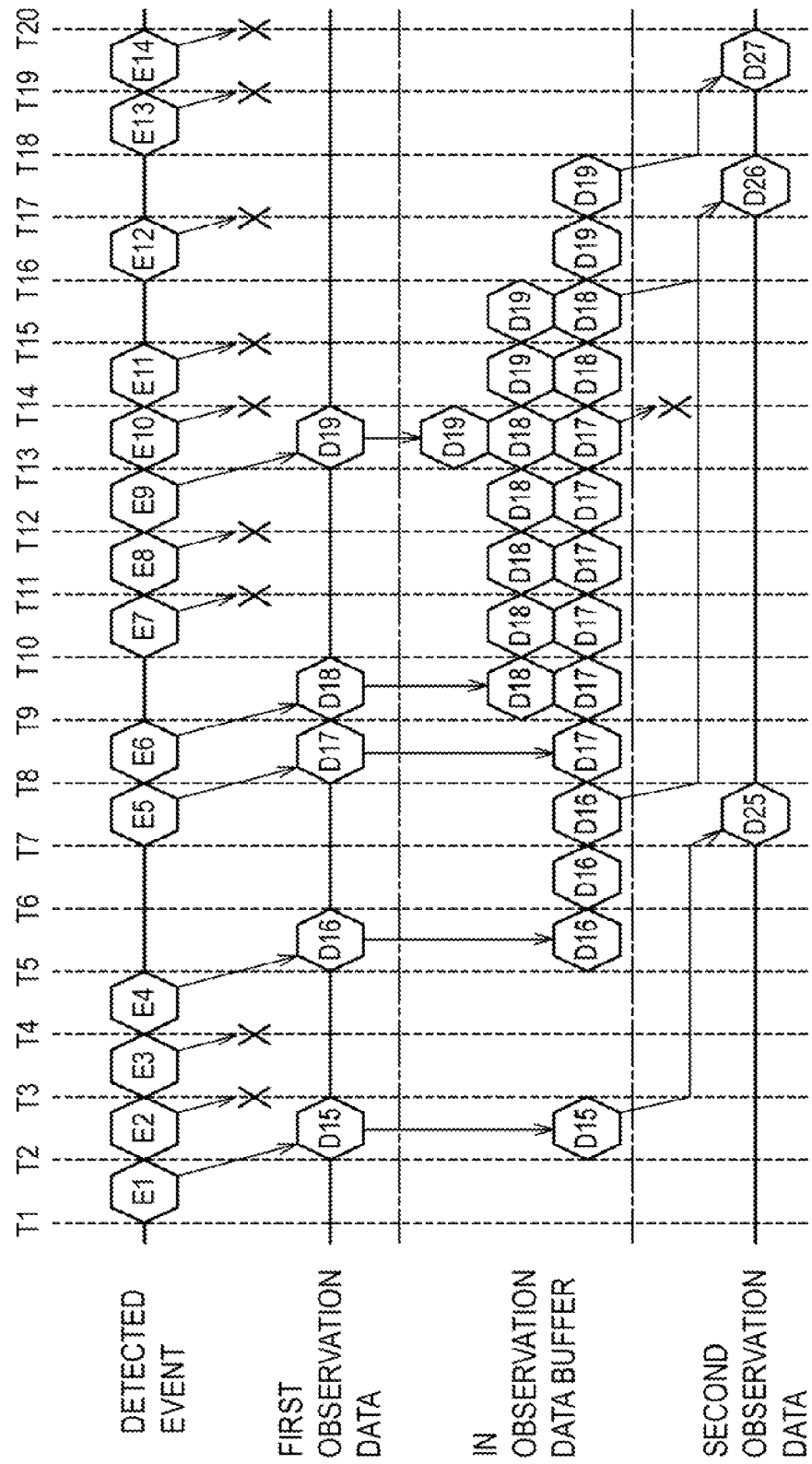
FIG. 15 A timing chart showing the processing of the trace/failure observation system according to the fifth embodiment of the present invention.

Next, the operation of the trace/failure observation system according to the fifth embodiment of the present invention will be described with reference to a timing chart of FIG. 15. In the timing chart of FIG. 15, T1 to T20 represent times on the internal processing cycle (such as clock cycle) of the system LSI. E1 to E14 represent events observed by the event detection unit. D15 to D19 represent pieces of observation data after the reduction processing of the first data reducing unit 311. D25 to D27 represent pieces of observation data after the reduction processing of the second data reducing unit 32.

The event detection unit 31 initially detects the events E1 to E4, E5 and E6, E7 to E11, E12, and E13 and E14 at times T1 to T4, T7 and T8, T10 to T14, T16, and T18 and T19, respectively. The event detection unit 31 transmits the observation data to the information extraction filter 312 which constitutes the first data reducing unit 311.

The information extraction filter 312 which constitutes the first data reducing unit 311 reduces the observation data transmitted from the event detection unit 31 according to a data reduction condition. FIG. 15 shows an example of processing where E1, E4, E5, E6, and E9 are determined to be pieces of data needed, and the rest of the data is discarded. The observation data output from the information extraction filter 312 is then transmitted to the objective data buffer 33.

The observation data buffer 33 temporarily stores the observation data output from the information extraction filter 312 which constitutes the first data reducing unit 311, until the observation data is received by the control processor 321 which constitutes the second data reducing unit 32. A FIFO (First-In First-Out) system or the like may be used for the buffering. In FIG. 15, the observation data buffer 33 initially receives the observation data D15 at time T2. Since the second data reducing unit 32 has no observation data in process, the observation data D15 is immediately passed to the second data reducing unit 32. The observation data buffer 33 then receives the observation data D16 at time T5. Since the second data reducing unit 32 is processing observation data, the observation data D16 is stored until passed at time T8. The observation data buffer 33 further receives the pieces of observation data D17, D18, and D19 at times T8, T9, and T13. Since the second data reducing unit 32 is processing the previous observation data or the previously-stored data still remains in the observation data buffer 33, the pieces of observation data are stored until passed to the second data reducing unit 32. The pieces of observation data D17, D18, and D19 are passed to the second data reducing unit 32 at times T14, T16, and T18, respectively.

The control processor 321 which constitutes the second data reducing unit 32 reads the observation data stored in the observation data buffer 33 and performs additional reduction processing with a plurality of steps of procedure. In the example of processing of FIG. 15, the first observation data D15 is processed into second observation data D25 for output. With the input of the first observation data D16 to D18, the whole of the piece of data D17 is determined to be unneeded and is discarded while D16 and D18 are processed into second observation data D26 for output. The first observation data D19 is processed into second observation data D27 for output. At times T5, T8, T9, and T13, the observation data is still in process when the next piece(s) of first observation data arrives/arrive. Since the observation data buffer 33 stores the observation data until reception, it is not needed to grasp the arrival time(s) of the next piece(s) of observation data or to complete the processing before the arrival of the observation data.

Next, an application of the trace/failure observation system according to the fifth embodiment of the present invention will be described with reference to timing charts of FIGS. 16 and 17. In the timing charts of FIGS. 16 and 17, T1 to T20 represent times on the internal processing cycle (such as clock cycle) of the system LSI. E1 to E14 represent events observed by the event detection unit. DA1 to DA3 represent pieces of observation data of series A after the reduction processing of the first data reducing unit 311. DB0 to DB2 represent pieces of observation data of series B after the reduction processing of the first data reducing unit 311. D28 and D29 represent pieces of observation data after the reduction processing of the second data reducing unit.

Figure 16:
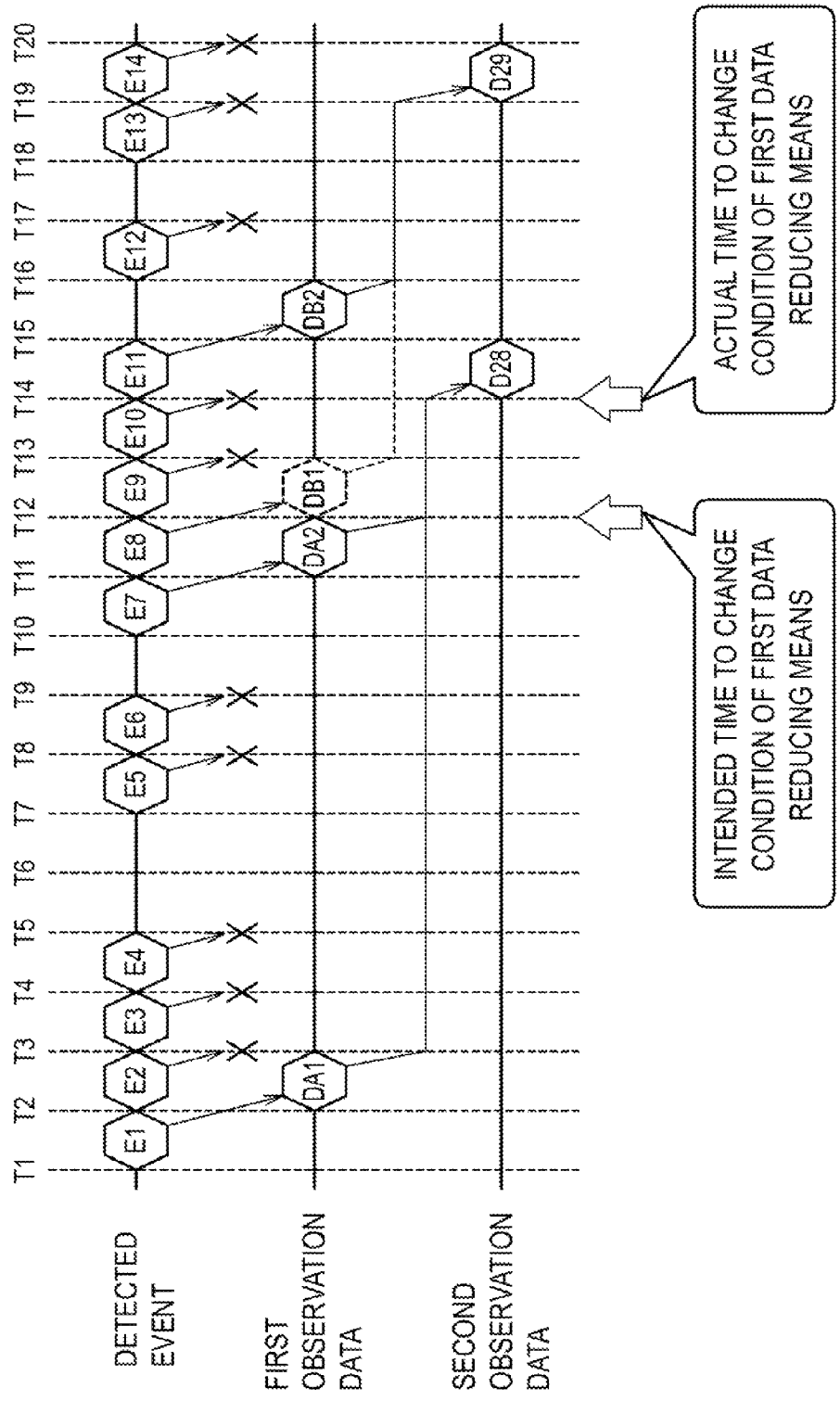
FIG. 16 A timing chart showing the processing of a trace/failure observation system where an action according to the fifth embodiment of the present invention is needed.

The timing chart of FIG. 16 shows the processing without the observation data buffer 33. In the timing chart of FIG. 16, the intended observation processing shall be such that the first observation data DA1 and DA2 of data series A is used to output the second observation data D28 while, depending on the content of observation, the observation target of the first data reducing unit 311 is immediately changed to data series B (at T12 which is the intended time to change the condition of the first data reducing unit) so that the first observation data DB1 and DB2 of data series B is used to output the second observation data D29. In reality, however, it sometimes takes time from the acquisition of the first observation data DA1 and DA2 of series A to the determination to change the observation target of the first data reducing unit 311. Without using the parallel processing of a plurality of series of observation data according to the third embodiment of the present invention, it is sometimes not possible to acquire the observation data DB1 that is needed for the output of the second observation data D29, which results in a failure of the desired observation, even if the observation target of the first data reducing unit 311 is changed after the completion of the determination to change the observation target of the first data reducing unit 311 (at T14 which is an actual time to change the condition of the first data reducing unit).

Figure 17:
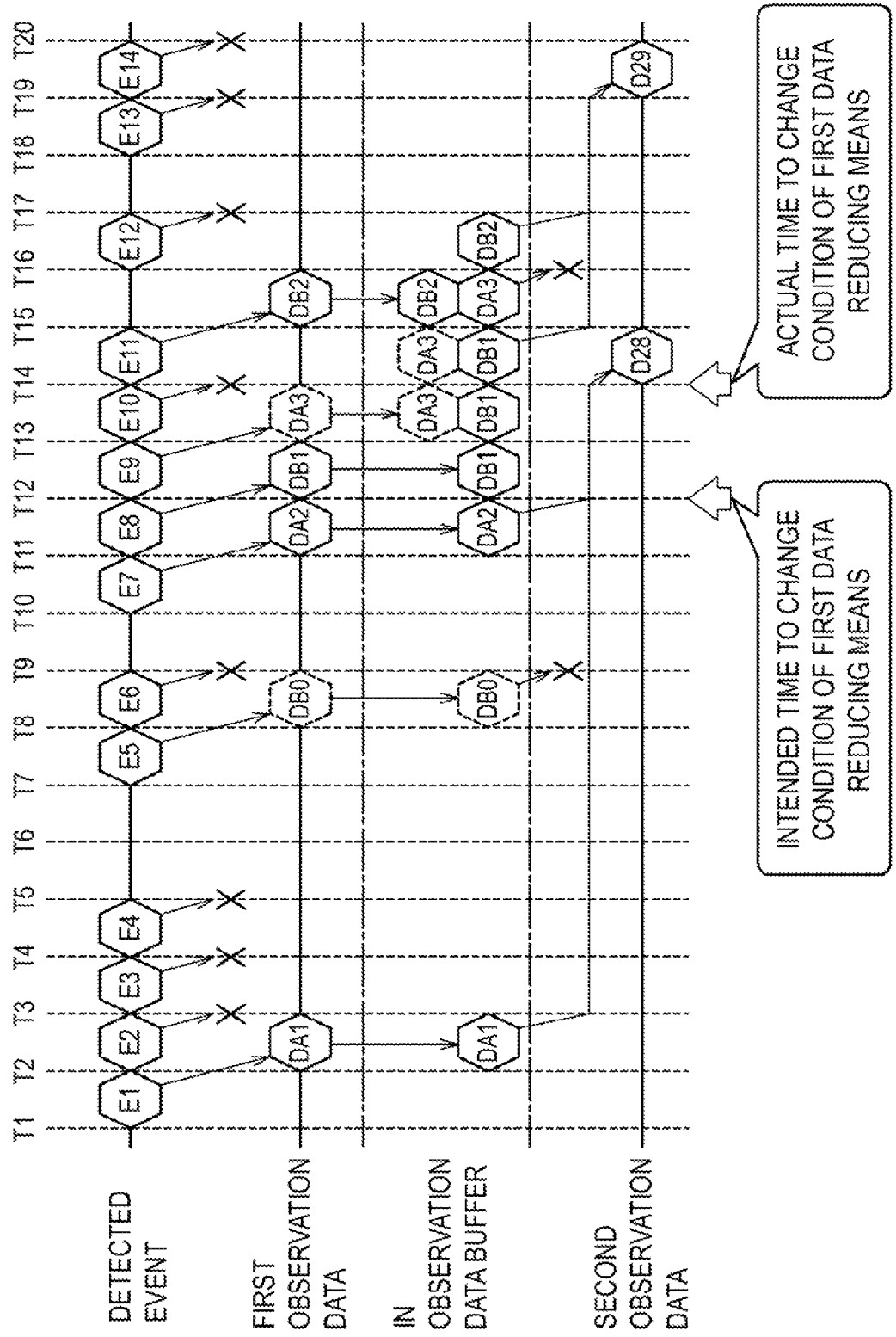
FIG. 17 A timing chart showing the processing of the trace/failure observation system according to the fifth embodiment of the present invention.

Now, the timing chart of FIG. 17 shows an example with the observation data buffer 33. In the timing chart of FIG. 17, the observation condition of the first data reducing unit 311 is initially set so as to pass both observation data series A and B. As seen at time T8, there can be observed an unneeded piece of observation data DB0 of data series B, which is discarded by the second data reducing unit 32. To reduce the amount of processing of unneeded observation data in the second data reducing unit 32, it is desirable to minimize the duration for which the observation condition of the first data reducing unit 311 is set so as to pass the data of both observation data series A and B. Observing the observation data DA1 and DA2, the second data reducing unit 32 makes a determination to change the observation condition of the first data reducing unit 311, changes the observation condition of the first data reducing unit 311 at time T14, and outputs the second observation data D28. By this point in time, the observation data DB1 of data series B is already output from the first data reducing unit 311 at time T12. Since the observation condition of the first data reducing unit 311 is set to pass the data of both observation data series A and B and the observation data DB1 is stored in the observation data buffer 33, the second data reducing unit 32 receives the observation data DB1 at time T15 and starts the data reduction processing of data series B. With such a method, the second data reducing unit 32 can perform the data reduction processing using the first observation data DB1 and DB2 of data series B and output the second observation data D29. Note that at time an unneeded piece of observation data DA3 of data series A is observed at T13 before the change of the observation condition of the first data reducing unit 311. The observation data DA3 is discarded by the second data reducing unit 32.

Next, the effect of the present embodiment will be described.

In the present embodiment, the observation data from the first data reducing unit 311 can be stored in the observation data buffer. It is therefore possible to make a proper observation even if the first data reducing unit 311 outputs observation data during the reduction processing of the second data reducing unit 32. Even if it takes time to make a determination to change the condition of the first data reducing unit 311, it is possible to obtain the same observation data as when the condition of the first data reducing unit 311 is changed by an immediate determination.

Sixth Embodiment

Next, a best mode for carrying out a sixth invention of the present invention will be described in detail with reference to the drawings.

Figure 18:
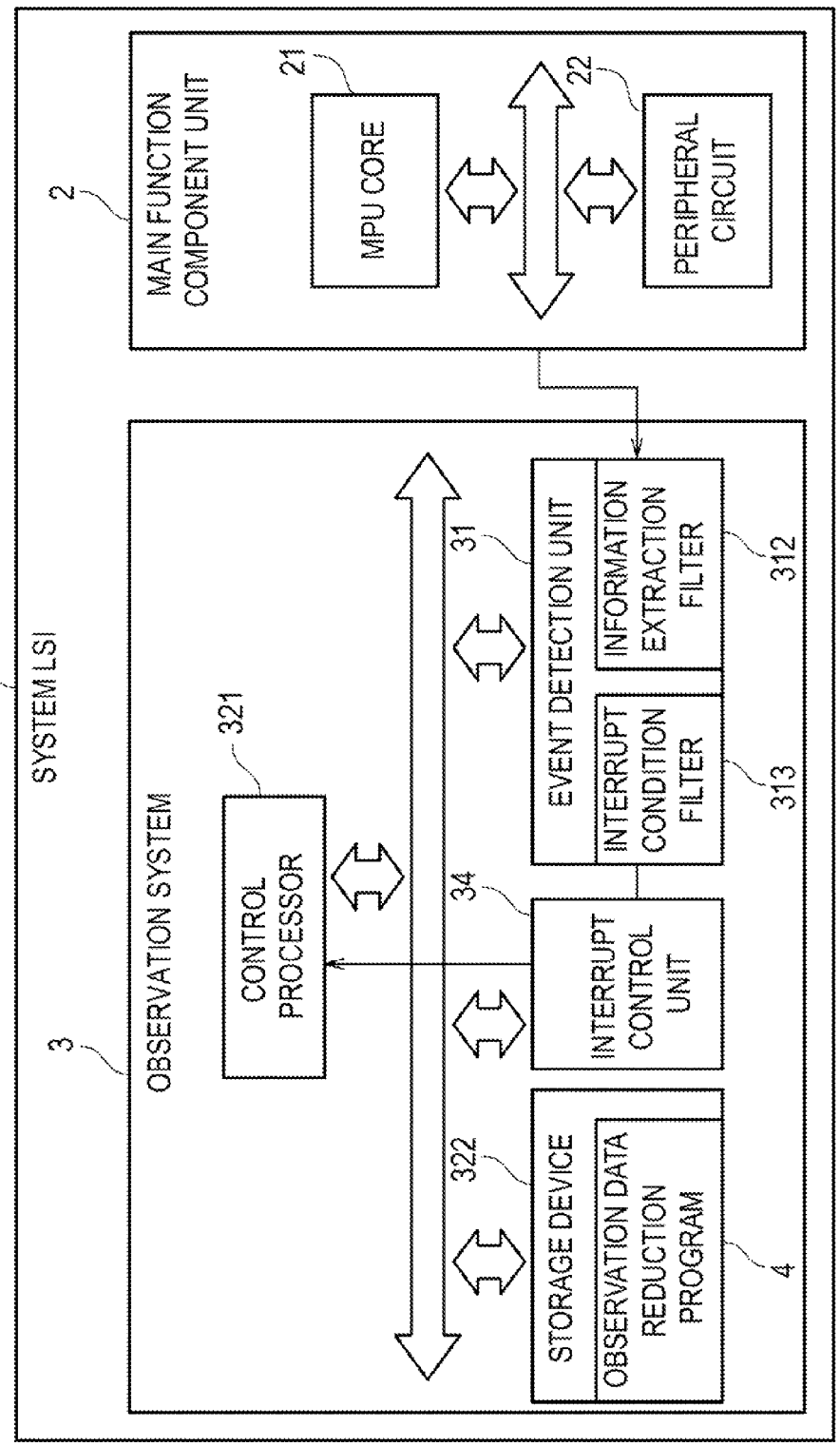
FIG. 18 A block diagram showing the configuration of a sixth embodiment of the present invention.

FIG. 18 is a block diagram showing the overall configuration of the trace/failure observation system according to a sixth embodiment of the present invention. In the present embodiment, an interrupt condition filter 313 is provided in the event detection unit 31 according to the configuration of the second embodiment. An interrupt control unit 34 which controls an interrupt signal to the control processor 321 is also provided. The interrupt condition filter 313 has the function of making a matching notification to the interrupt control unit 34 upon detection of an event that matches a set condition. The interrupt control unit 34 performs control such as setting whether or not to make an interrupt notification to the control processor 321 when receiving the matching notification from the interrupt condition filter 313. It is desirable that the condition of the interrupt condition filter 313 can be arbitrarily changed from the control processor 321 by such techniques as the provision of a setting register. It is also desirable that a plurality of conditions can be set in the interrupt condition filter 313.

Figure 19:
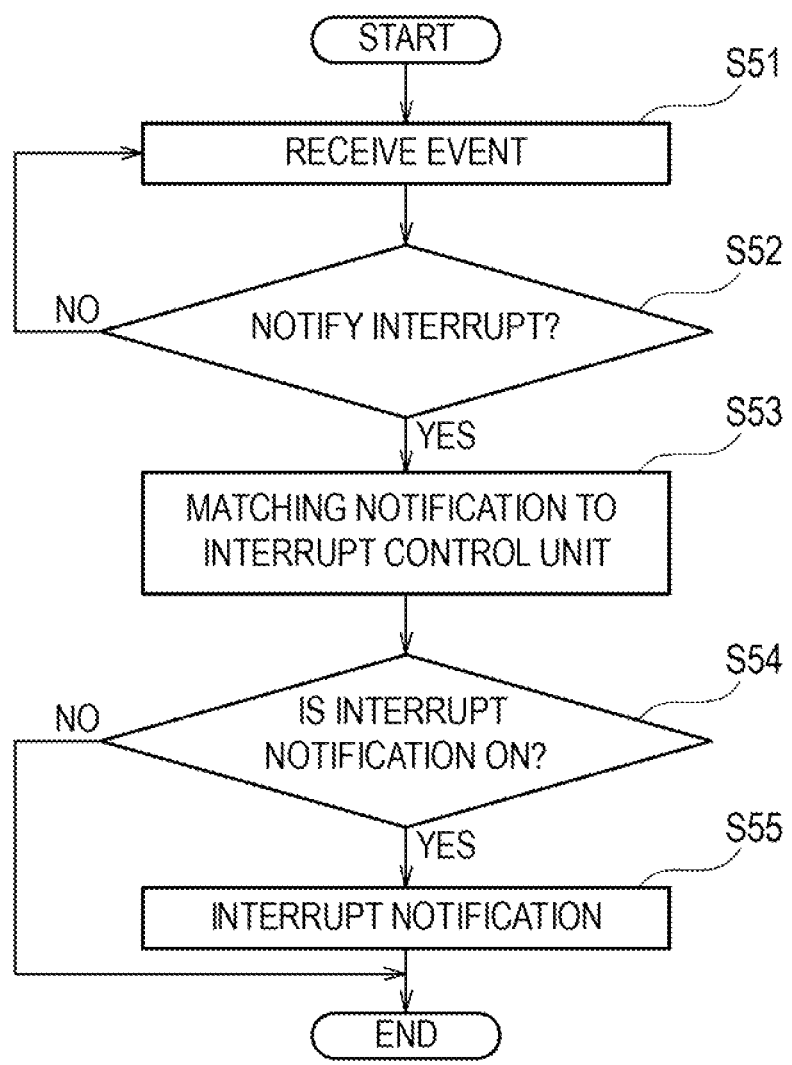
FIG. 19 A flowchart showing the processing procedure of an interrupt condition filter and an interrupt control unit according to the sixth embodiment of the present invention.

Next, the operation of the interrupt condition filter 313 and the interrupt control unit 34 will be described with reference to a flowchart of FIG. 19. As shown in FIG. 19, the interrupt condition filter 313 receives an event detected by the event detection unit 31 (step S51). If the detected event received does not match a set interrupt condition (No at step S52), the interrupt condition filter 313 returns to step S51. If the detected event received matches the interrupt condition (Yes at step S52), the interrupt condition filter 313 makes a matching notification to the interrupt control unit 34 (step S53).

Then, if an interrupt notification to the control processor 321 is disabled (No at step S54), the interrupt control unit 34 ends the processing. If an interrupt notification is enabled (Yes at step S54), the interrupt control unit 34 makes the notification to the control processor 321 (step S55). Receiving the interrupt notification, the control processor 321 executes an interrupt processing program.

Suppose that the interrupt condition of the interrupt condition filter 313 is set to be the same as the condition of the information extraction filter, and observation data is saved to the storage device 322 by interrupt processing whenever needed. With such a configuration, a system without the observation data buffer 33 according to the fifth embodiment of the present invention can receive subsequent pieces of observation data during the observation data reduction processing.

Moreover, if the system LSI is capable of power and clock control, the power and clock control can be performed to allow the application of the trace/failure observation system to the power saving function. In such a case, the system is configured so that the interrupt notification can be delivered to the power and clock control unit of the system LSI.

When starting the system LSI, an observation start condition is initially set in the interrupt condition filter 313, and the control processor 321 is set on standby. Suspending the power supply to nonoperating components such as the control processor 321 and the storage device 322 or giving an instruction for a clock supply unit to suspend the clock supply brings the system into power saving mode. When the interrupt condition filter 313 receives an event that matches the condition, the system resumes from the power saving mode and an interrupt notification of the occurrence of the event is made to the control processor 321. Receiving the interrupt notification, the control processor 321 sets the information extraction filter 312 and the like if needed, and starts observation.

The power saving function may be implemented in combination with the state machine function according to the fourth embodiment of the present invention. Here, a certain state of the state machine function is defined as a standby state, and the system is configured to enter power saving mode when in the standby state. The system resumes from the standby state by the above-mentioned procedure, and performs various reduction processing in an observation state other than the standby state. If a certain state transition condition is detected in the observation state, the system enters the standby state. With such a technique, the system enters the power saving mode for power saving when in the standby state where no measurement is needed, and makes observations by switching the state between the standby state and the observation state intended for normal observation depending on the situation. Such a configuration makes it possible to add the function for reducing unnecessary power consumption.

Next, the effects of the present embodiment will be described.

The present embodiment is configured so that the interrupt condition filter 313 and the interrupt control unit 34 can notify of the detection of a certain event. If an event that needs an urgent action occurs while the control processor 321 is performing some processing, it is therefore possible to suspend the processing and perform the processing of the event. This also eliminates the need for the control processor 321 to keep monitoring the observation data that is notified from the interrupt condition filter 312 while performing processing. It is therefore possible to perform more complicated processing such as data compression in the period to wait for observation data, with a further reduction in the amount of observation data. Suppose that the interrupt condition of the interrupt condition filter 313 is set to be the same as the condition of the information extraction filter, and observation data is saved to the storage device 322 by interrupt processing whenever needed. With such a configuration, even a system without the observation data buffer 33 according to the fourth embodiment of the present invention can receive subsequent pieces of data during the observation data reduction processing. Moreover, if the system LSI is capable of power and clock control, the interrupt notification may be delivered to the power and clock control unit of the system LSI. Such a configuration allows application to the power saving function.

Seventh Embodiment

Next, a best mode for carrying out a seventh invention of the present invention will be described in detail with reference to the drawings.

Figure 20:
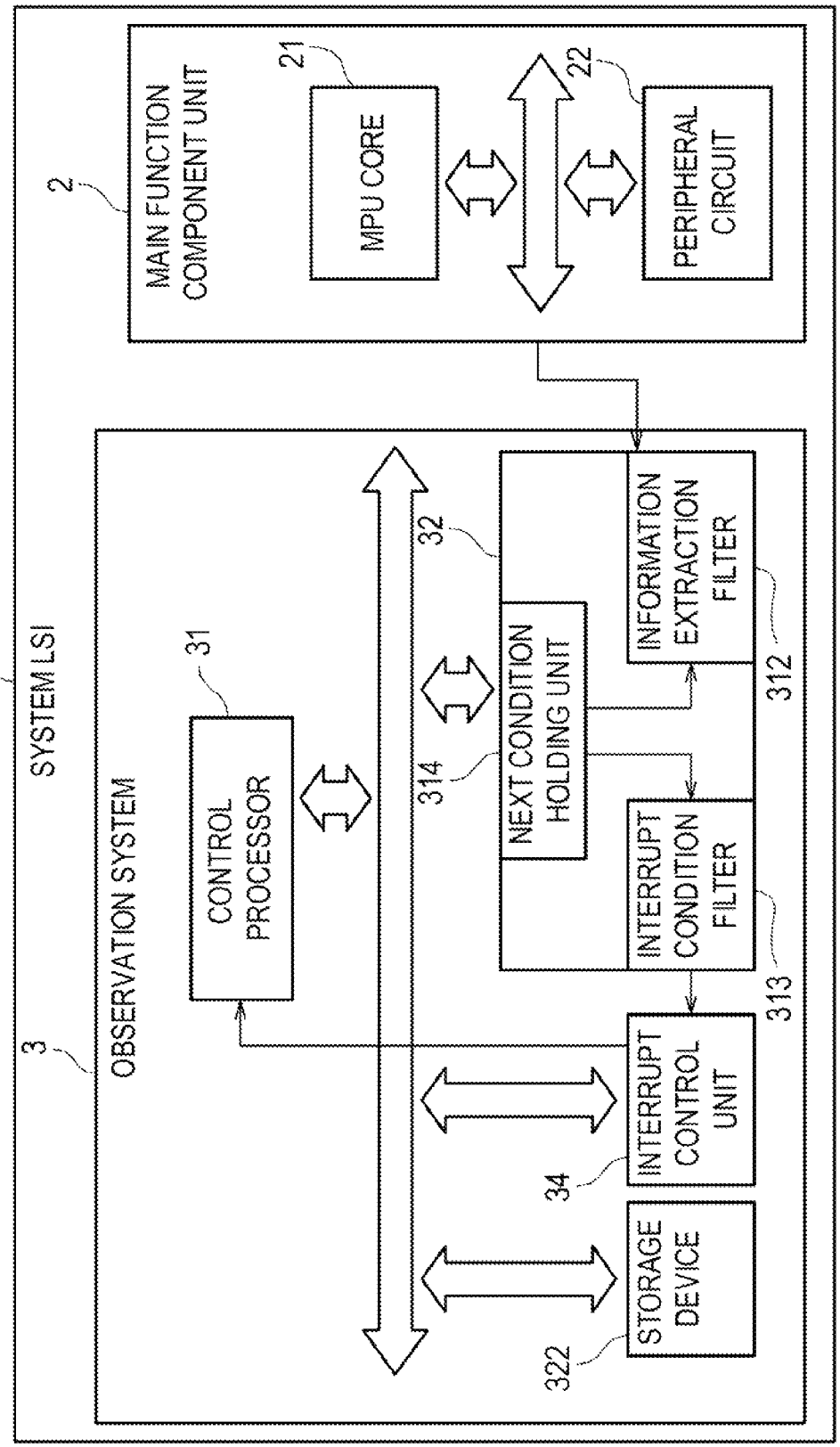
FIG. 20 A block diagram showing the configuration of a seventh embodiment of the present invention.

FIG. 20 is a block diagram showing the overall configuration of the trace/failure observation system according to a seventh embodiment of the present invention. In the present embodiment, the event detection unit 31 according to the configuration of the sixth embodiment further includes a next condition holding unit 314 which holds next conditions to be set in the information extraction filter 312 and the interrupt condition filter 313.

Figure 21:
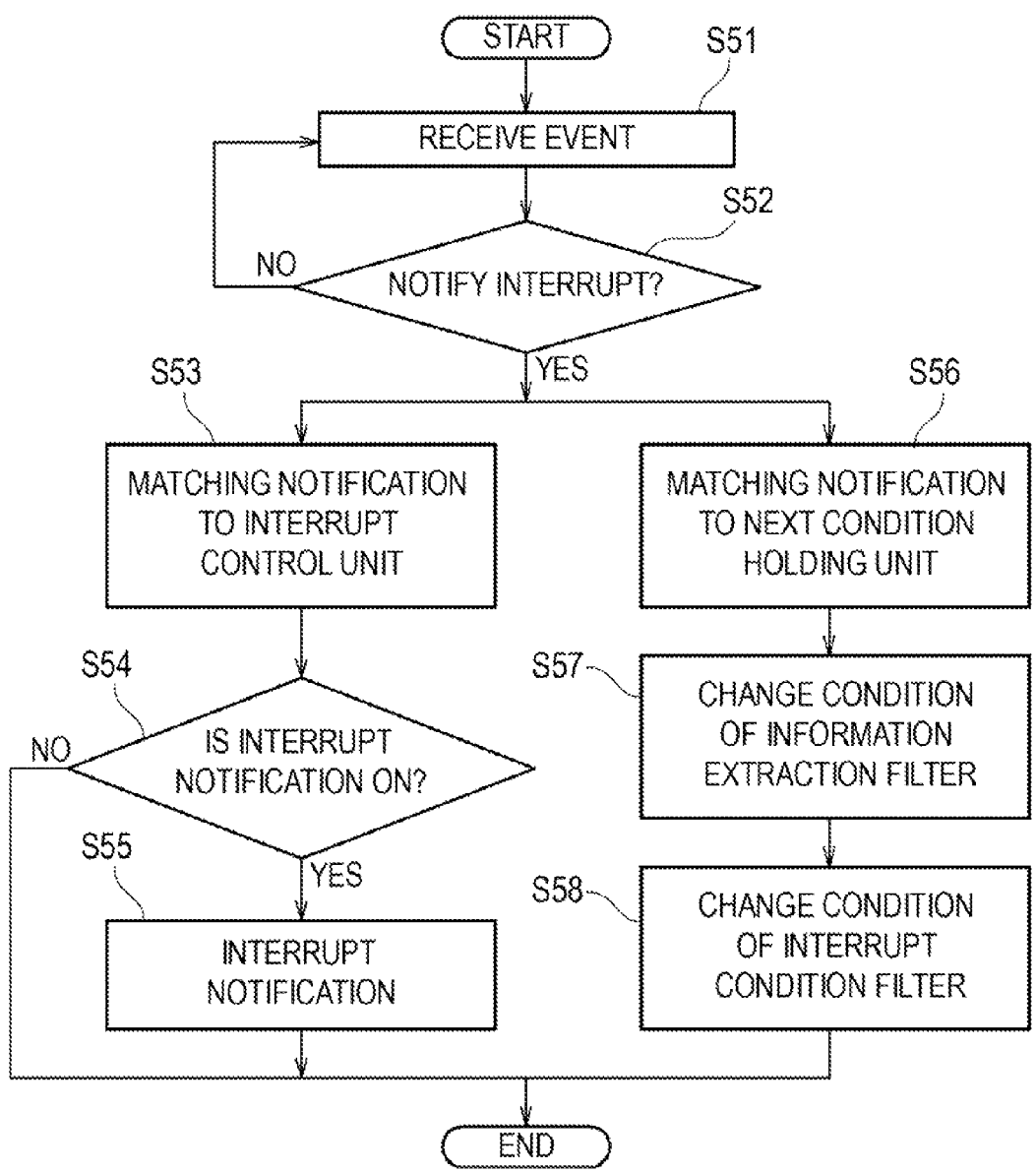
FIG. 21 A flowchart showing the processing procedure of an interrupt condition filter, an interrupt control unit, and a next condition holding unit according to the seventh embodiment of the present invention.

Next, the operation of the interrupt condition filter 313, the interrupt control unit 34, and the next condition holding part 314 will be described with reference to a flowchart of FIG. 21. As shown in FIG. 21, the interrupt condition filter 313 receives an event detected by the event detection unit 31 (step S51). If the detected event received does not match a set interrupt condition (No at step S52), the interrupt condition filter 313 returns to step S51. If the detected event received matches the interrupt condition (Yes at step S52), the interrupt condition filter 313 makes a matching notification both to the interrupt control unit 34 (step S53) and to the next condition holding unit 314 (step S56). The procedure of step S53 and subsequent steps on the side of the interrupt control unit 34 is the same as in FIG. 19. In the meantime, the next condition holding unit 314, when receiving the matching notification, changes the condition of the information extraction filter 312 (step S57) and changes the condition of the interrupt condition filter 313 (step S58) according to the settings of the next condition holding unit 314. Steps S57 and S58 here are in no particular order, and may be simultaneously executed in parallel. Observation can sometimes be performed without either of the processing.

With an interrupt notification enabled, the interrupt control unit 34 makes an interrupt notification to the control processor 321 here. It is possible to constantly change the condition of the first data reducing unit and make observations if the interrupt processing program of the control processor 321 is configured so that the still next conditions to be set in the information extraction filter 312 and the interrupt condition filter 313 are set into the next condition holding unit 314. When starting an observation, values intended for the initial conditions of the information extraction filter 312 and the interrupt condition filter 313 are usually set into the next condition holding unit 314 as initial values for operation. The next condition holding unit 314 is desirably configured so that it can hold a plurality of sets of next conditions to be set in the information extraction filter 312 and the interrupt condition filter 313.

In the present embodiment, a matching notification is made by the interrupt condition filter 313 to the interrupt control unit 34 and the next condition holding unit 314. In another possible configuration, matching notifications to the interrupt control unit 34 and the next condition holding unit 314 may be made on respective different conditions so as to allow more precise control.

Next, the effects of the present embodiment will be described.

In the present embodiment, the condition of the information extraction filter 312 can be changed by the interrupt condition filter 313 and the next condition holding unit 314 without the intervention of the control processor 321. With such a configuration, it is possible to immediately change the condition of the first data reducing means for observation. If the interrupt processing program of the control processor 321 is configured so that the still next conditions to be set in the information extraction filter 312 and the interrupt condition filter 313 are set into the next condition holding unit 314, it is possible to perform observation while constantly performing the action of immediately changing the condition of the first data reducing means.

Example

Next, the configuration and operation of a best mode for carrying out the present invention will be described in conjunction with a specific example.

Figure 22:
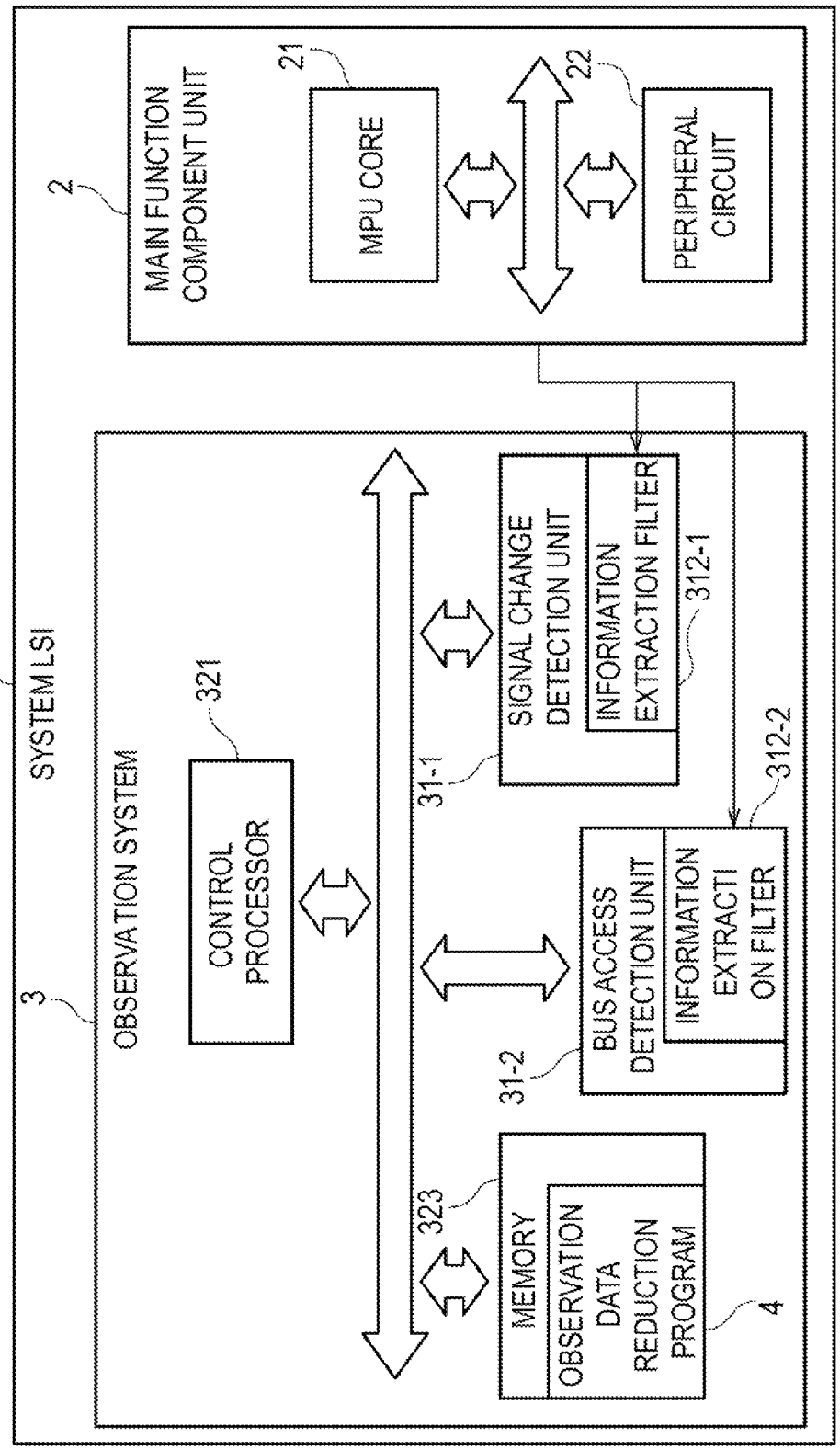
FIG. 22 A block diagram showing the configuration of an example of the present invention.
Figure 24:
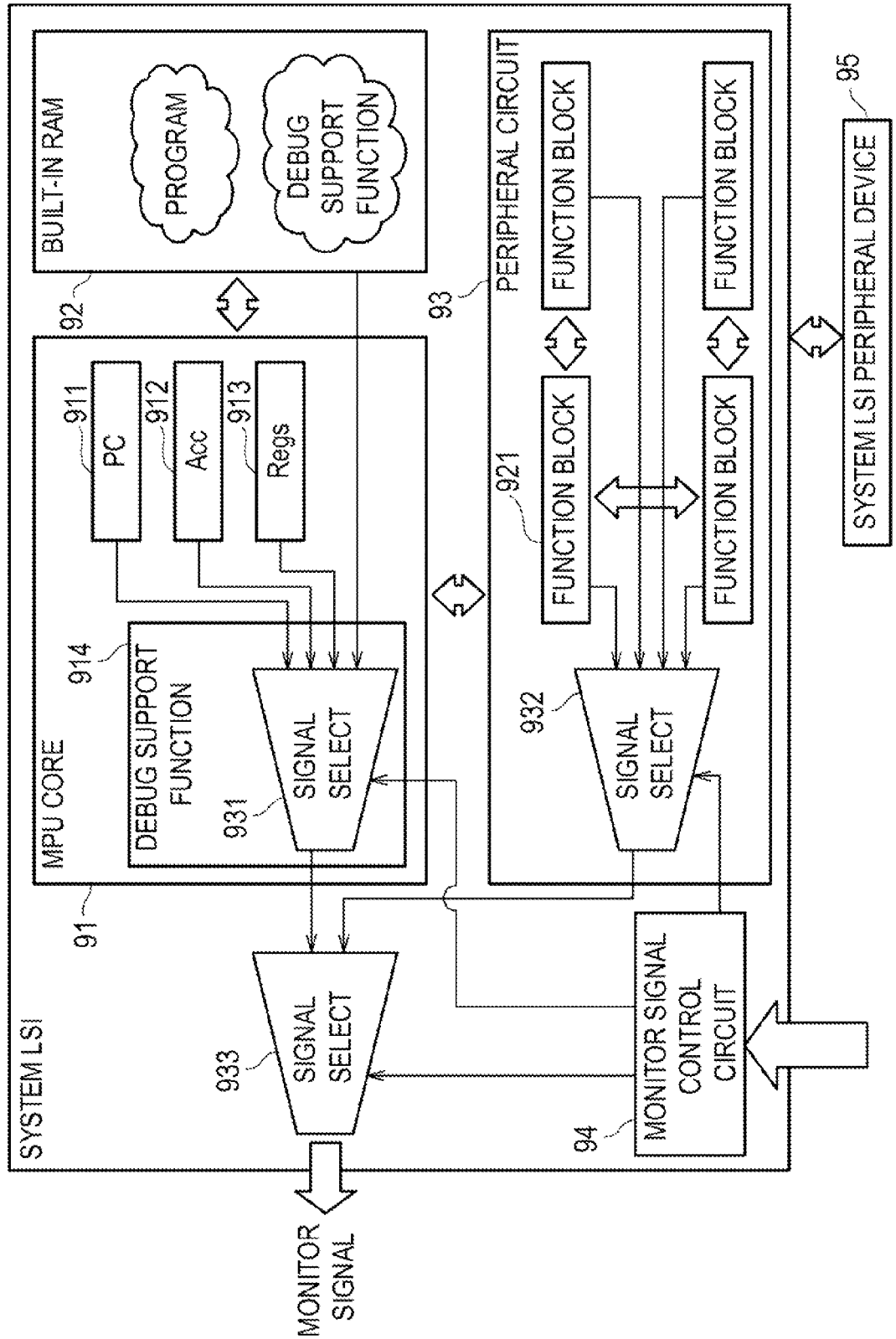
FIG. 24 A block diagram showing the configuration of the trace/failure observation system disclosed in PTL 1.

FIG. 22 is a block diagram showing the overall configuration of the trace/failure observation system according to the example of the present invention. The reference sign 1 represents a system LSI, which includes a main function component unit 2 to be observed and an observation system 3. The main function component unit 2 typically has a MPU core 21, a peripheral circuit 22, and so on. The observation system 3 includes a signal change detection unit 31-1 which detects a change of the interrupt signal etc., and a bus access detection unit 31-2 which detects a bus access. The detection units 31-1 and 31-2 correspond to the event detection unit 31 according to the embodiments of the present invention. The signal change detection unit 31-1 includes an information extraction filter 312-1 which narrows down signal changes to observe, and the bus access detection unit 31-2 includes an information extraction filter 312-2 which narrows down bus accesses to observe. The information extraction filters 312-1 and 312-2 correspond to the first data reducing unit 311 according to the embodiments of the present invention. The second data reducing unit 32 according to the embodiments of the present invention includes a control processor 321, a storage device or memory 323, and an observation data reduction program 4.

Next, the components of the trace/failure observation system will be described in detail.

The signal change detection unit 31-1 and the narrowing information extraction filter 312-1 observe changes of signals to be observed, such as an interrupt signal and signals that indicate the operation statuses of respective parts, and screen out and output the signal changes according to a set condition. To reduce the signal observation data, it is possible to use methods such as passing observation data only at a rise and fall of a certain signal, passing only part of a plurality of signals, and passing only observation data that fits a certain bit pattern.

The bus access detection unit 31-2 and the information extraction filter 312-2 detect the occurrence of bus accesses, and screen out and output data according to a set condition. To screen out the bus accesses, it is possible to use methods such as passing accesses from a certain bus master, passing accesses to a certain address area, screening and passing read accesses or write accesses, and screening and passing a specified access type (based on such factors as whether a burst access or a single access, and the length of a burst access).

The observation data reduction program 4 may use methods such as one based on program direct processing (FIG. 23A)) where the data reduction processing procedure is directly coded as a program, and one based on procedure list processing (FIG. 23BB) where the data reduction processing procedure is retained on the memory 323 as a procedure list and the program executes the procedure list for processing.

Next, the operation of the control processor 321 according to the observation data reduction program 4 will be described with reference to the flowcharts of FIG. 23. In the program direct processing of FIG. 23(*a*), the control processor 321 receives observation data through the information extraction filters (step S61), and performs the data reduction processing according to the programmed procedure (step S62). The data reduction processing of step S62 may be part or all of the data reduction processing procedures illustrated in the embodiments of the present invention, or a combination thereof. Then, if the observation is to be ended (Yes at step S63), the processing is ended. If the observation is to be continued (No at step S63), the processing returns to step S61. In the procedure list processing of FIG. 23(*b*), the control processor 321 initially receives observation data through the information extraction filters at step S64, and reads the procedure list retained on the memory 323 (step S65). The control processor 321 then performs the data reduction processing according to the procedure described in the procedure list (step S66). The data reduction processing of step S66 may be part or all of the data reduction processing procedures illustrated in the example of the present invention, or a combination thereof. Then, if the observation is to be ended (Yes at step S67), the processing is ended. If the observation is to be continued (No at step S67), the processing returns to step S64. While the example of this flowchart shows such a procedure for the sake of illustrating the course of processing, the processing procedure need not be read at step S65 each time the observation data is received at step S64. Instead, the procedure list once read may be retained and used over a certain period of time.

It should be noted that the trace/failure observation system according to the present invention may be implemented by hardware or by the execution of a program by an MPU other than the MPU core.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

INDUSTRIAL APPLICABILITY

Examples of the application of the present invention include an observation system in a system LSI.

REFERENCE SIGNS LIST

1: system LSI
2: main function component unit
21: MPU core
22: peripheral circuit
23: bus
3: observation system
31: event detection unit
31-1: signal change detection unit
31-2: bus access detection unit
311: first data reducing means
312: information extraction filter
312-1: information extraction filter
312-2: information extraction filter
313: interrupt condition filter
314: next condition holding unit
315: observation data register
316: status register
317: bus slave interface
318: condition setting register
32: second data reducing means
321: control processor
322: storage device
323: memory
33: observation data buffer
34: interrupt control unit
4: observation data reduction program
91: MPU core
92: built-in RAM
93: peripheral circuit
94: monitor signal control circuit
95: system LSI peripheral device
911: program counter
912: accumulator
913: various registers
914: debug support circuit
921: function block
931 to 933: signal select circuit

The invention claimed is:

1. A trace system arranged in a system LSI (Large Scale Integration) to be subjected to trace, the system comprising:
an event detecting unit for observing behavior of the system LSI to be observed and detecting an event to obtain observation data on the detected event;
a first data reducing unit for performing first reduction processing on the observation data obtained by the event detecting unit according to a reduction condition;
a second data reducing unit for performing second reduction processing, which is different from the first reduction processing, on the reduced observation data obtained through the first reduction processing performed by the first data reducing unit;
an interrupt condition filter configured to make a matching notification when detecting an event that matches a set interrupt condition; and
an interrupt control unit configured to perform control such as setting whether or not to make an interrupt notification to the second data reducing unit when receiving the matching notification from the interrupt condition filter, wherein
the second data reducing unit controls the reduction condition for the first reduction processing of the first data reducing unit depending on the reduced observation data obtained by the first data reducing unit so that the reduced observation data has an amount of information processable by the second data reducing unit.

2. The trace system according to claim 1, wherein the second data reducing unit includes a control processor, a storage device, and a data reduction program.

3. The trace system according to claim 1, wherein the second data reducing unit has a function of performing parallel processing on two or more data series.

4. The trace system according to claim 1, wherein the second data reducing unit is constituted by a state machine function.

5. The trace system according to claim 1, further comprising an observation data buffer that temporarily stores observation data output from the first data reducing unit.

6. The trace system according to claim 1, further comprising:
a next condition holding unit that holds a next condition to be set in the first data reducing unit and the interrupt condition filter, and sets the next condition in the first data reducing unit and the interrupt condition filter held when receiving a condition change instruction.

7. The trace system according to claim 1, wherein the first data reducing unit performs the reduction processing within a cycle time from arrival of a piece of observation data to that of a next piece of observation data.

8. The trace system according to claim 1, wherein the first data reducing unit performs the reduction processing within a cycle time by defining a data series and determining data to pass depending on whether or not the data coincides with the defined data series.

9. The trace system according to claim 1, wherein:
the first data reducing unit reduces data by selecting part of pieces of data; and
the second data reducing unit reduces data by selecting part of data from a group of data.

10. The trace system according to claim 1, wherein:
the trace system needs a period longer than or equal to a cycle time from arrival of a piece of observation data to that of a next piece of observation data to determine whether or not to change control, or to control the first data reducing unit; and
the second data reducing unit switches, depending on a result of detection by the event detecting unit, between a control of setting the first data reducing unit so as to pass observation data both pertaining to a first series of observation data and a second series of observation data and selecting data in the first series of observation data for data reduction and a control of setting the first data reducing unit so as to pass observation data pertaining to the second series of observation data.

11. The trace system according to claim 1, wherein:
the trace system needs a period longer than or equal to a cycle time from arrival of a piece of observation data to that of a next piece of observation data to determine whether or not to change control, or to control the first data reducing unit; and
the second data reducing unit switches, depending on a result of detection by the event detecting unit, between a control of setting the first data reducing unit so as to pass observation data both pertaining to a first series of observation data and a second series of observation data and selecting data in the first series of observation data for data reduction and a control of setting the first data reducing unit so as to pass observation data pertaining to the second series of observation data and selecting data pertaining the second series of observation data for data reduction.

12. A trace method to be performed in a system LSI (Large Scale Integration) to be subjected to trace according to program instructions stored in a computer-readable medium, the instructions causing a computer to execute:

an event detecting unit observing behavior of the system LSI to be observed and detecting an event to obtain observation data on the detected event;
a first data reducing unit performing first reduction processing on the observation data obtained by the event detecting unit according to a reduction condition;
a second data reducing unit performing second reduction processing, which is different from the first reduction processing, on the reduced observation data obtained through the first reduction processing performed by the first data reducing unit;
an interrupt condition filter configured to make a matching notification when detecting an event that matches a set interrupt condition; and
an interrupt control unit configured to perform control such as setting whether or not to make an interrupt notification to the second data reducing unit when receiving the matching notification from the interrupt condition filter, wherein
the second data reducing unit controls the reduction condition for the first reduction processing of the first data reducing unit depending on the reduced observation data obtained by the first data reducing unit so that the reduced observation data has an amount of information processable by the second data reducing unit.

13. A non-transitory computer readable recording medium that records a trace program causing a trace system to execute a process, the trace system being arranged in a system LSI (Large Scale Integration) to be subjected to trace, the process including:
an event detecting unit observing behavior of the system LSI to be observed and detecting an event to obtain observation data on the detected event;
a first data reducing unit performing first reduction processing on the observation data obtained by the event detecting unit according to a reduction condition;
a second data reducing unit performing second reduction processing, which is different from the first reduction processing, on the reduced observation data obtained through the first reduction processing performed by the first data reducing unit;
an interrupt condition filter making a matching notification when detecting an event that matches a set interrupt condition; and
an interrupt control unit performing control such as setting whether or not to make an interrupt notification to the second data reducing unit when receiving the matching notification from the interrupt condition filter, wherein
the second data reducing unit controls the reduction condition for the first reduction processing of the first data reducing unit depending on the observation data obtained by the first data reducing unit so that the reduced observation data has an amount of information processable by the second data reducing unit.

* * * * *